(12) United States Patent
Sugiura et al.

(10) Patent No.: US 11,459,875 B2
(45) Date of Patent: Oct. 4, 2022

(54) WIRELESS INTEGRATED DATA RECORDER

(71) Applicant: SANVEAN TECHNOLOGIES LLC, Katy, TX (US)

(72) Inventors: Junichi Sugiura, Bristol (GB); Stephen Jones, Cypress, TX (US)

(73) Assignee: SANVEAN TECHNOLOGIES LLC, Katy, TX (US)

( * ) Notice: Subject to any disclaimer, the term of this patent is extended or adjusted under 35 U.S.C. 154(b) by 186 days.

(21) Appl. No.: 16/896,883

(22) Filed: Jun. 9, 2020

(65) Prior Publication Data

US 2020/0386096 A1 Dec. 10, 2020

Related U.S. Application Data

(60) Provisional application No. 62/859,498, filed on Jun. 10, 2019.

(51) Int. Cl.
| | |
|---|---|
| *E21B 47/01* | (2012.01) |
| *E21B 47/12* | (2012.01) |
| *E21B 47/26* | (2012.01) |
| *E21B 44/00* | (2006.01) |
| *E21B 7/04* | (2006.01) |
| *G01V 1/52* | (2006.01) |
| *H04L 67/12* | (2022.01) |

(Continued)

(52) U.S. Cl.
CPC ............. *E21B 47/12* (2013.01); *E21B 7/04* (2013.01); *E21B 21/08* (2013.01); *E21B 44/005* (2013.01); *E21B 47/017* (2020.05); *E21B 47/26* (2020.05); *G01V 1/52* (2013.01); *H04L 67/12* (2013.01); *H04W 4/38* (2018.02); *E21B 4/02* (2013.01); *E21B 17/1078* (2013.01); *E21B 47/024* (2013.01); *E21B 47/07* (2020.05); *E21B 49/003* (2013.01); *G01V 2200/16* (2013.01); *G06N 5/04* (2013.01); *G06N 20/00* (2019.01); *G16Y 10/20* (2020.01); *G16Y 40/10* (2020.01); *G16Y 40/20* (2020.01)

(58) Field of Classification Search
CPC ............................ E21B 47/017; E21B 47/013
See application file for complete search history.

(56) References Cited

U.S. PATENT DOCUMENTS

| | | |
|---|---|---|
| 6,585,043 B1 | 7/2003 | Murray |
| 7,025,136 B2 | 4/2006 | Tulloch et al. |

(Continued)

OTHER PUBLICATIONS

A. Hecker, et al.; "A Novel Technique for Measuring (Not Calculating) Young's Modulus, Poisson's Ratio and Fractures Downhole: A Bakken Case Study"; SPWLA 58th Annual Logging Symposium; Jun. 17-21, 2017; Oklahoma City, OK (18 pages).

*Primary Examiner* — Giovanna Wright
(74) *Attorney, Agent, or Firm* — Ewing & Jones, PLLC

(57) ABSTRACT

An integrated data recorder may be positioned within a slot in a tool. The integrated data recorder includes a sensor package that includes one or more drilling dynamics sensors, a processor in data communication with the one or more drilling dynamics sensors, a memory module in data communication with the one or more drilling dynamics sensors, a wireless communications module in data communication with the processor, and an electrical energy source in electrical communication with the memory module, the one or more drilling dynamics sensors, and the processor.

45 Claims, 23 Drawing Sheets

(51) Int. Cl.
*H04W 4/38* (2018.01)
*E21B 21/08* (2006.01)
*E21B 47/017* (2012.01)
*G06N 20/00* (2019.01)
*E21B 47/07* (2012.01)
*E21B 4/02* (2006.01)
*E21B 17/10* (2006.01)
*E21B 47/024* (2006.01)
*E21B 49/00* (2006.01)
*G16Y 10/20* (2020.01)
*G16Y 40/20* (2020.01)
*G16Y 40/10* (2020.01)
*G06N 5/04* (2006.01)

(56) References Cited

U.S. PATENT DOCUMENTS

| | | | |
|---|---|---|---|
| 2013/0239673 A1* | 9/2013 | Garcia-Osuna | G01V 1/52 324/333 |
| 2015/0176390 A1* | 6/2015 | Greening | E21B 47/007 73/152.49 |
| 2015/0330212 A1* | 11/2015 | Sassi | E21B 47/07 166/250.1 |
| 2016/0053593 A1* | 2/2016 | Romer | E21B 43/122 700/282 |
| 2017/0254190 A1 | 9/2017 | Jones et al. | |
| 2018/0066513 A1* | 3/2018 | Sugiura | E21B 47/01 |

\* cited by examiner

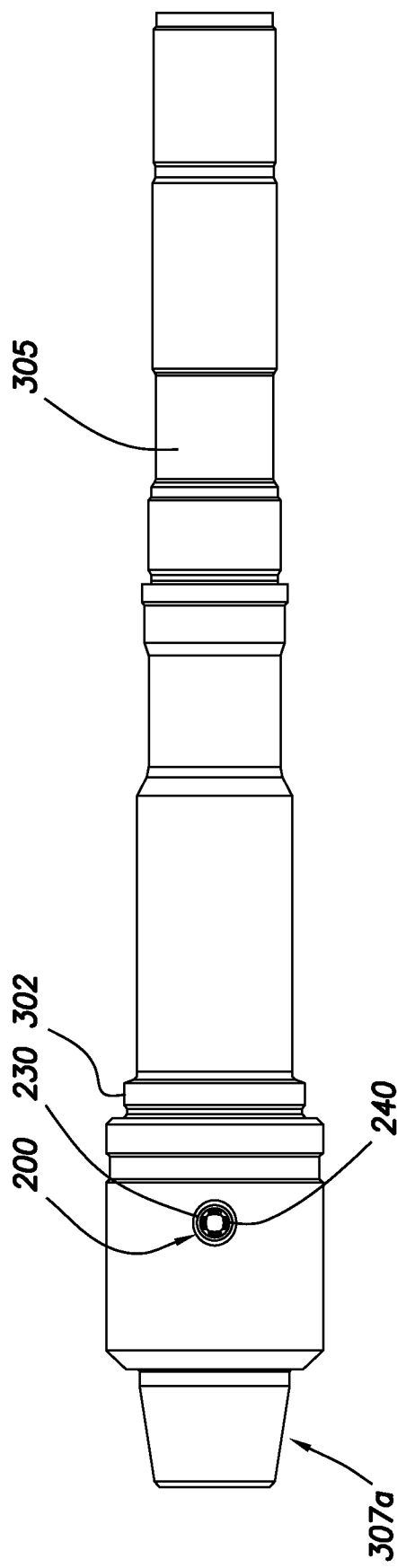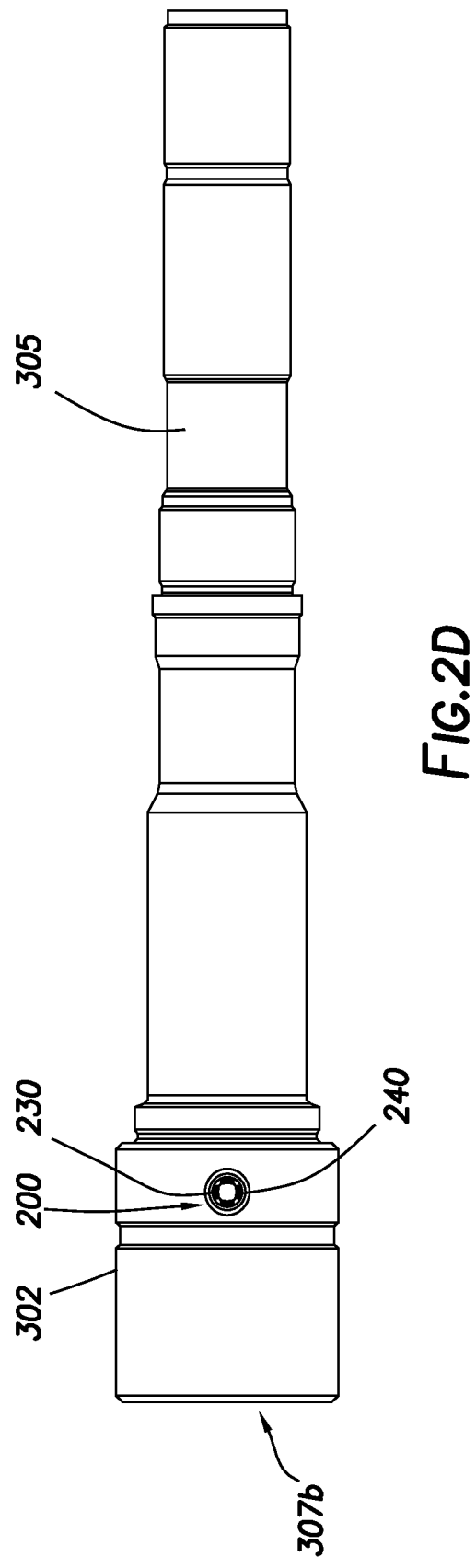
FIG.2C
FIG.2D

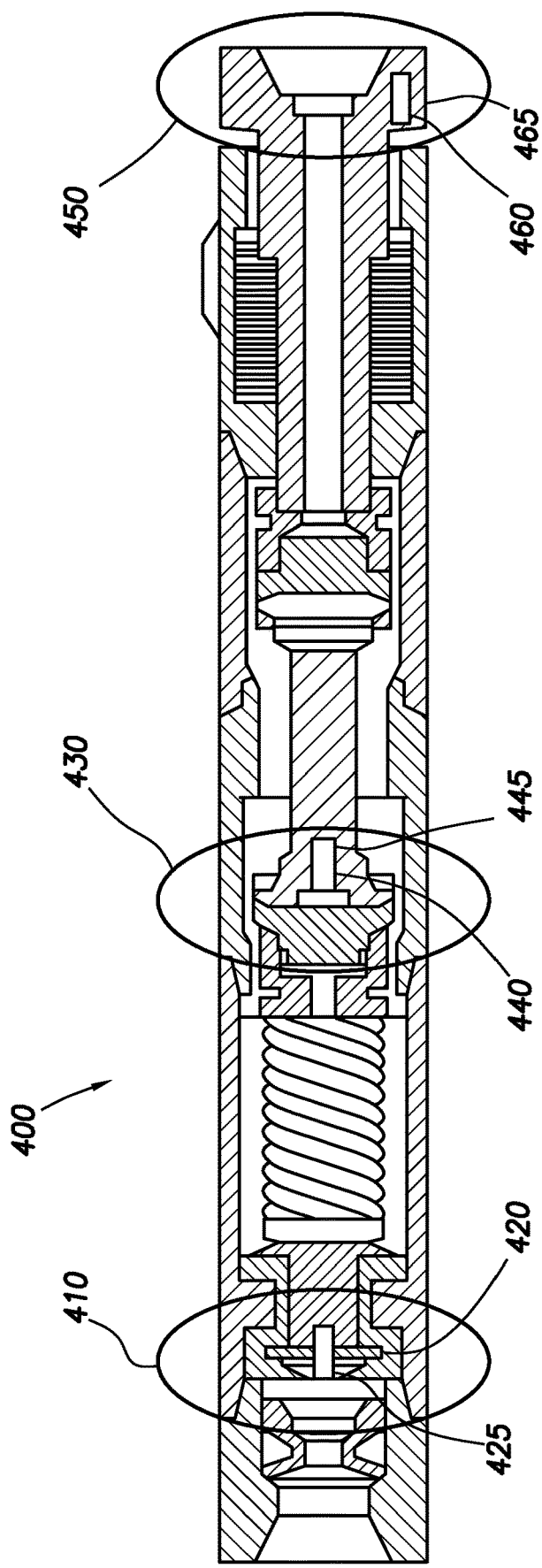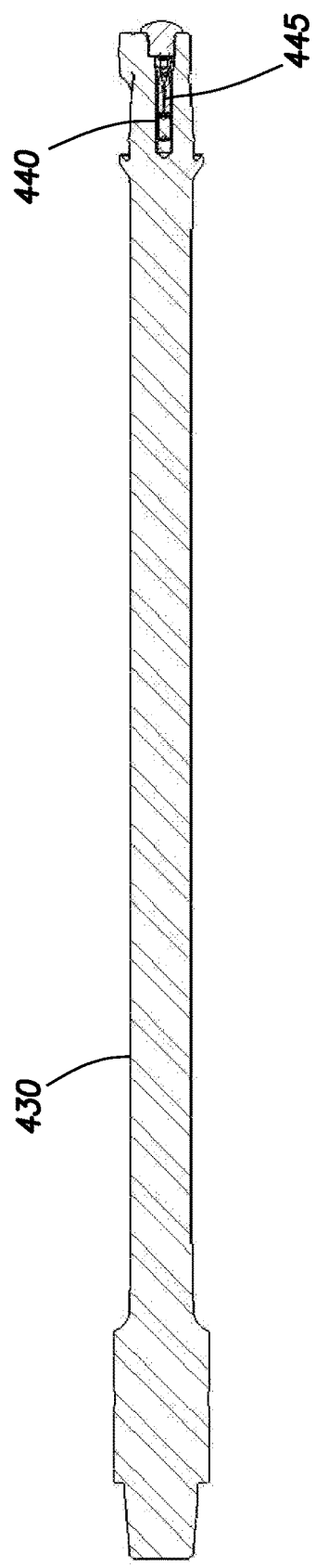
FIG.4
FIG.4A

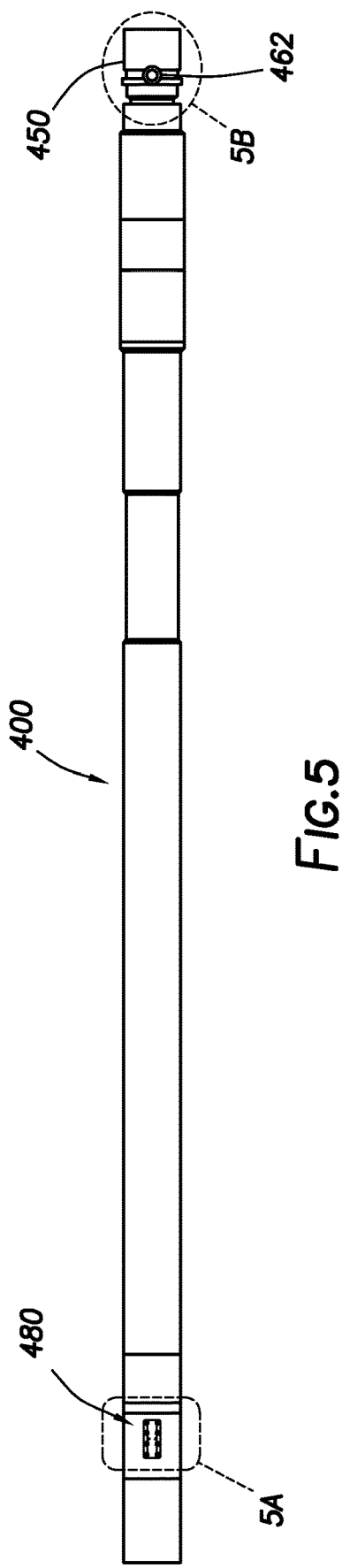

WIRELESS INTEGRATED DATA RECORDER

CROSS REFERENCE TO RELATED APPLICATIONS

This application is a non-provisional application which claims priority from U.S. provisional application No. 62/859,498, filed Jun. 10, 2019, which is incorporated by reference herein in its entirety.

TECHNICAL FIELD/FIELD OF THE DISCLOSURE

The present disclosure relates generally to oilfield equipment, and specifically to integrated data recorders for oilfield equipment.

BACKGROUND OF THE DISCLOSURE

Wellbores are traditionally formed by rotating a drill bit positioned at the end of a bottom hole assembly (BHA). The drill bit may be actuated by rotating the drill pipe, by use of a mud motor, or a combination thereof. As used herein, the BHA includes the drill bit. Conventionally, BHAs may contain only a limited number of sensors and have limited data processing capability. The operating life of the drill bit, mud motor, bearing assembly, and other elements of the BHA may depend upon operational parameters of these elements, and the downhole conditions, including, but not limited to rock type, pressure, temperature, differential pressure across the mud motor, rotational speed, torque, vibration, drilling fluid flow rate, force on the drill bit or the weight-on-bit ("WOB"), inclination, total gravity field, gravity toolface, revolutions per minute (RPM), radial acceleration, tangential acceleration, relative rotation speed and the condition of the radial and axial bearings. The combination of the operational parameters of the BHA and downhole conditions are referred to herein as "drilling dynamics."

To supplement conventional BHA sensors, drilling dynamics data may be measured by drilling dynamics sensors. Measurement of these aspects of elements of the BHA may provide operators with information regarding performance and may indicate need for maintenance. Conventional downhole drilling dynamics sensors are located on a dedicated sub used to house the sensors. The conventional downhole drilling dynamics sensor sub is mechanically coupled to a portion of the drill string or the desired downhole drilling equipment, directly or indirectly. Conventional drilling dynamics sensor subs also require physical connections to be made to retrieve measurements made by the drilling dynamics sensors.

SUMMARY

The present disclosure provides for an integrated data recorder positioned within a slot in a tool. The integrated data recorder may include a sensor package comprising one or more drilling dynamics sensors. The integrated data recorder may include a processor in data communication with the one or more drilling dynamics sensors. The integrated data recorder may include a memory module in data communication with the one or more drilling dynamics sensors. The integrated data recorder may include a wireless communications module in data communication with the processor. The integrated data recorder may include an electrical energy source in electrical communication with the memory module, the one or more drilling dynamics sensors, and the processor.

The present disclosure also provides for an integrated data recorder system. The integrated data recorder system may include an integrated data recorder. The integrated data recorder may include a sensor package comprising one or more drilling dynamics sensors. The integrated data recorder may include a memory module in data communication with the sensor package. The integrated data recorder may include a wireless communications module in data communication with the processor. The integrated data recorder may include a processor in data communication with the drilling dynamics sensor. The integrated data recorder may include an electrical energy source in electrical communication with the memory module, the sensor package, and the processor. The integrated data recorder system may include a tool having a slot. The integrated data recorder may be positioned within the slot.

The present disclosure also provides for a method. The method may include providing an integrated data recorder positioned within a tool. The integrated data recorder may include a sensor package comprising one or more drilling dynamics sensors. The integrated data recorder may include a memory module in data communication with the sensor package. The integrated data recorder may include a wireless communications module in data communication with the processor. The integrated data recorder may include a processor in data communication with the one or more drilling dynamics sensors. The integrated data recorder may include an electrical energy source in electrical communication with the memory module, the sensor package, and the processor. The method may include taking measurements using the drilling dynamics sensors. The method may include transmitting the measurements from the drilling dynamics sensors to an external device using the wireless communications module.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2C is a side view of a motor mandrel including an integrated data recorder consistent with at least one embodiment of the present disclosure.

FIG. 2D is a side view of a motor mandrel including an integrated data recorder consistent with at least one embodiment of the present disclosure.

FIG. 4 depicts integrated data recorders within a mud motor consistent with at least one embodiment of the present disclosure.

FIG. 4A depicts a transmission of a mud motor consistent with at least one embodiment of the present disclosure.

FIG. 5 depicts integrated data recorders within a mud motor consistent with at least one embodiment of the present disclosure.

FIG. 5A depicts an integrated data recorder consistent with certain embodiments of the present disclosure.

FIG. 5B depicts an integrated data recorder consistent with certain embodiments of the present disclosure

DETAILED DESCRIPTION

Figure 1:
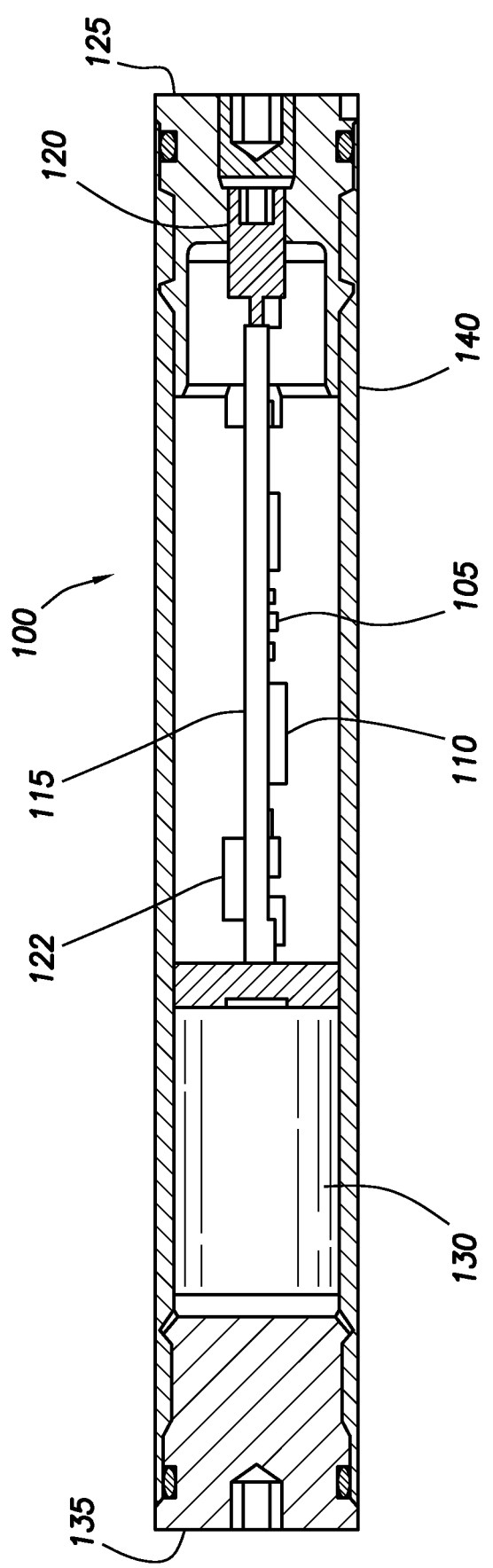
FIG. 1 depicts a cross section of an integrated data recorder consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an embodiment of integrated data recorder 100 consistent with at least one embodiment of the present disclosure. The embodiment of integrated data recorder shown in FIG. 1 is a "pressure barrel" design. Integrated data recorder 100 includes sensor package 110. Sensor package 110 may include drilling dynamics sensors including, but not limited to, low-g accelerometers for determination of inclination, total gravity field, radial acceleration, tangential acceleration, and/or low-g vibration sensing; and/or gravity toolface; high-g accelerometers for shock sensing; temperature sensors; three-axis gyroscopes for rotation speed (angular velocity) computation; Hall-effect sensors to measure relative rotation speed, along with a magnetic marker or markers; one or more strain gauges to measure one or more of tension, compression, torque on bit, weight on bit, bending moment, bending toolface, and pressure; and magnetometers for rotation speed (angular velocity) computation. Sensor package 110 may include any or all of drilling dynamics sensors listed and may include other drilling dynamics sensors not listed. Sensor package 110 may include redundant sensors, for example and without limitation, two 3-axis low-g accelerometers and/or two 3-axis gyro sensors. Redundant sensors may improve reliability and accuracy. Further, the drilling dynamics sensors may be used for determination of other drilling dynamics data other than that listed. In certain embodiments, one or more of the drilling dynamics sensors may be digital, solid-state sensors. Digital, solid-state sensors may create less noise, have a smaller footprint, have lower mass, be more shock-resistant, be more reliable and have better power management than analog sensors. In some embodiments, one or more of the drilling dynamics sensors may be analog sensors. In some such embodiments, analog sensors may be used, for example and without limitation, with analog-to-digital converters. In certain embodiments, the accelerometers may be three-axis accelerometers. The three-axis accelerometers may be digital or analog sensors, including, but not limited to quartz accelerometers. In some embodiments, the gyroscopes may be three-axis gyroscopes.

As used herein, low-g accelerometers may measure up to between +/−16G. As used herein, high-g accelerometers may measure up to between +/−200G. Rotation speed in RPM (revolutions per minute) may be measured, for example, between 0 and 500 RPM. Temperature may be measured, for example, between −40° C. and 175° C., between −40° C. and 150° C. or between −40° C. and 125° C. As further described herein below, the measurement range of the sensors may be programmable while integrated data recorder 100 is within the wellbore. For example, the low-g accelerometers measurement range may be changed from +/−4G to +/−16G while drilling.

With further attention to FIG. 1, integrated data recorder 100 may include memory module 115 in data communication with sensor package 110. Memory module 115 is adapted to store data gathered by the sensors in sensor package 110. Memory module 115 is in data communication with communication port 120. Communication port 120 is adapted to provide a data communications link between memory module 115 and a surface processor. Communication port 120 may be adapted to communicate with other processors in a communication bus (e.g. MWD tool) via a common communication bus, for example, transmitting drilling dynamics data, statistics based on drilling dynamics data, rock mechanics information, or a combination thereof to surface via MWD.

Also depicted in FIG. 1 is processor 105. Processor 105 may be in data communication with the sensors in sensor package 110 and memory module 115. Processor 105 may control the operation of the sensors in sensor package 110, as described herein below. Processor 105 may include application software/firmware stored on a computer readable media, such as program Flash memory, which is part of Processor 105. One non-limiting example of processor 105 with program Flash memory is a 16-bit microcontroller, Model SM470R1B1M-HT from Texas Instruments (Dallas, Tex., USA). The application software/firmware may include instructions, for example and without limitation, for executing deep-sleep mode, standby mode, and active mode, as described herein below. The application software/firmware in processor 105 may be loaded and replaced, via communication port bus 176 through communication port 120, by a surface processor. Integrated data recorder 100 may further include a real-time clock, an oscillator, a fuse, and a voltage regulator. Processor 105 includes, but is not limited to a microcontroller, microprocessor, DSP (digital signal processor), DSP controller, DSP processor, FPGA (Field-Programmable Gate Array) or combinations thereof.

Memory module 115, processor 105, and sensor package 110 and/or the sensors in sensor package 110 may be in electrical communication with electrical energy source 130. Electrical energy source 130 provides power to processor 105, memory module 115, and the sensors in sensor package 110. In some non-limiting embodiments, electrical energy source 130 may be a lithium battery. In yet other embodiments, electrical energy source 130 may be electrically connected to sensors in sensor package 110 indirectly through a voltage regulator. In other embodiments, electrical energy source 130 may be positioned in a package separate from sensor package 110. In certain embodiments, electrical energy source 130 is a battery, such as a rechargeable battery or a non-rechargeable battery. In other embodiments, electrical energy source 130 may be a rechargeable or non-rechargeable battery with an energy harvesting device. In some embodiments, the energy harvesting device may be a piezo-electric energy harvester or a MEMS energy harvester. In some embodiments, the energy harvesting device may include a solenoid coil generator with one or more corresponding magnets positioned on a component of tool 300.

As depicted in FIG. 1, processor 105, sensor package 110, memory module 115, communication port 120, and electrical energy source 130 may be housed within pressure barrel 140. In the embodiment depicted in FIG. 1, pressure barrel 140 is cylindrical or generally cylindrical. In other embodiments, pressure barrel 140 may be of other shapes adapted to contain processor 105, sensor package 110, memory module 115, communication port 120, electrical energy source 130, and wireless communications module 122. In some embodiments, the pressure within pressure barrel 140 is atmospheric or near-atmospheric pressure. In some embodiments, the pressure rating for pressure barrel 140 may be at least 15,000 psi.

In some embodiments, the downhole battery life of electrical energy source 130 may be at least 240 hours (or 10 days), and in some embodiments, memory module 115 may have at least 16 M Bytes of storage. In some embodiments, memory module 115 may have up to 8 gigabytes of storage.

As further shown in FIG. 1, end caps 125, 135 may be fitted to the ends of pressure barrel 140. In some embodiments, one or more of pressure barrel 140 or end caps 125, 135 may be formed from a generally electrically, magnetically, and/or electromagnetically transparent material. In some embodiments, for example and without limitation, pressure barrel 140 or end caps 125, 135 may be formed from one or more of a polymer such as polyether ether ketone (PEEK), high-temperature rubber, high-temperature plastic, or high-temperature ceramic material. Depending on the operating conditions to which integrated data recorder 200 will be subjected, a material having high resilience, high mechanical, chemical, and temperature resistance may be used. For example, integrated data recorder 200 used in an oil or gas wellbore may encounter higher temperatures, pressures, and chemical reactivity than integrated data recorder 200 used in a mining operation, and may, accordingly, be built of more resilient materials.

In certain embodiments, communication port 120 may protrude through memory dump end cap 125.

Figure 1A:
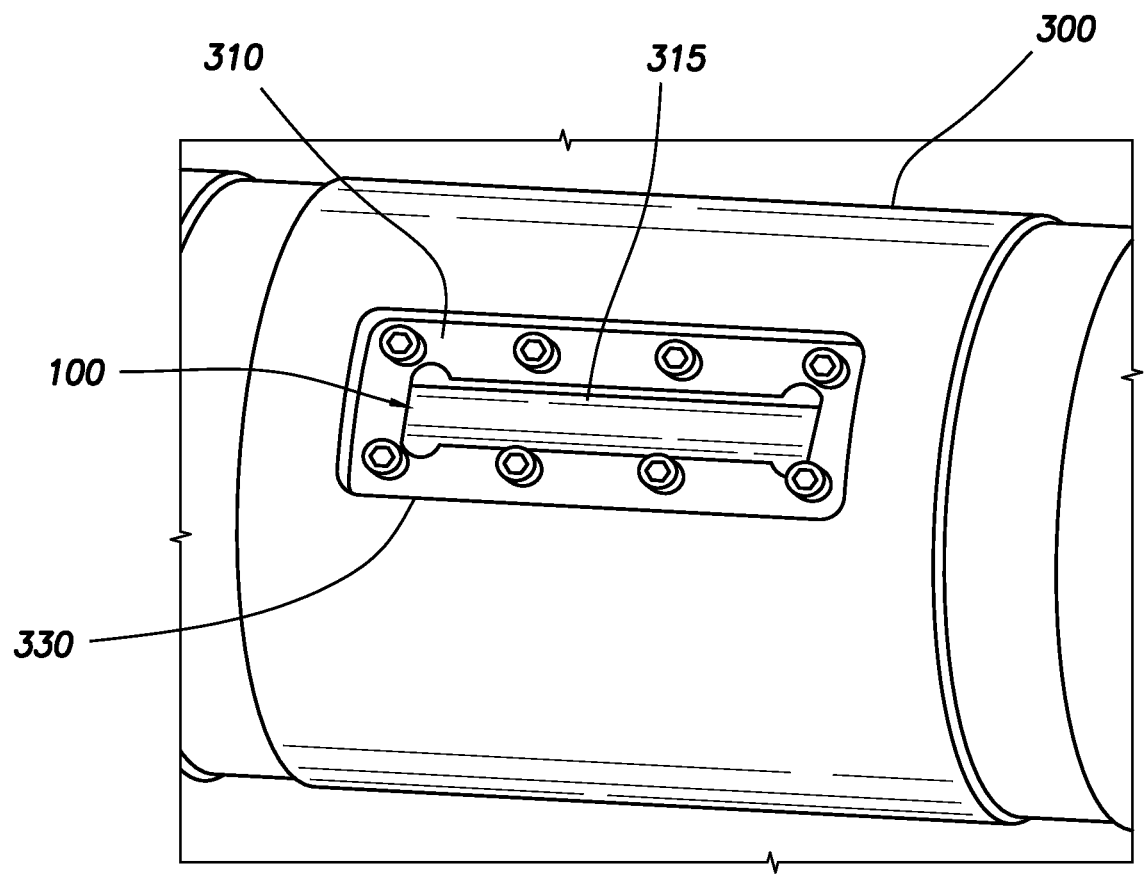
FIG. 1A depicts the integrated data recorder of FIG. 1 within a tool consistent with at least one embodiment of the present disclosure.

FIG. 1A depicts integrated data recorder 100 within tool 300 in one embodiment of the present disclosure. In some embodiments, tool 300 may be any component of a drill or tool string within a wellbore, and may include, for example and without limitation, a component of a BHA, drill bit, stabilizer, cross-over, drill pipe, drill collar, pin-box connection, jar, reamer, underreamer, friction reducing tool, string stabilizer, near-bit stabilizer, mud motor, turbine, stick-slip mitigation tool, or bearing housing. In some embodiments, tool 300 may be any steerable tool, including, for example and without limitation, a straight motor, a steerable motor, a steerable wired-motor, steerable turbine, steerable wired-turbine, steerable gear-reduced turbine, motor-assisted rotary-steerable tool, turbine-assisted rotary-steerable tool, gear-reduced turbine-assisted rotary-steerable tool, MWD (measurement-while-drilling) integrated steerable tool, or coiled tubing steerable tool. In some embodiments, tool 300 may be part of an oil and gas drilling string or may be part of a mining tool or mining string including a mining bit. In some embodiments, tool 300 may be a component of a drill or tool string located at the surface for drilling, geothermal drilling, coring and mining or may be a piece of equipment coupled to the drill string and may include, for example and without limitation, a Kelly shaft, saver sub, tool joint connection clamp, or component of a top drive such as a quill.

Figure 1B:
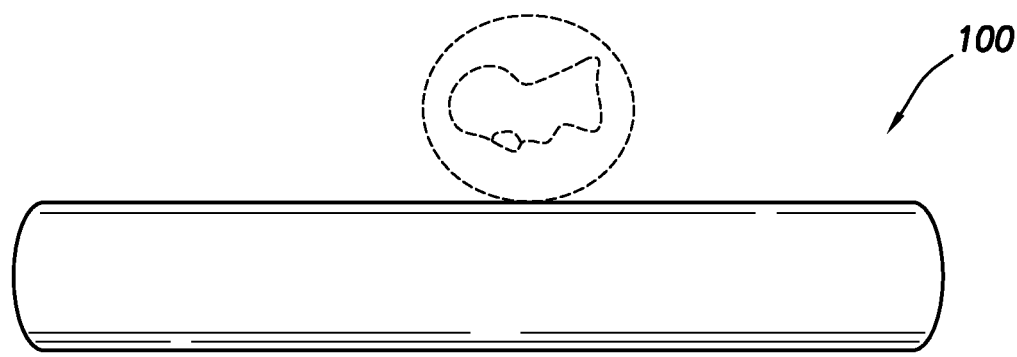
FIG. 1B is a perspective view of the integrated data recorder of FIG. 1.
Figure 1C:
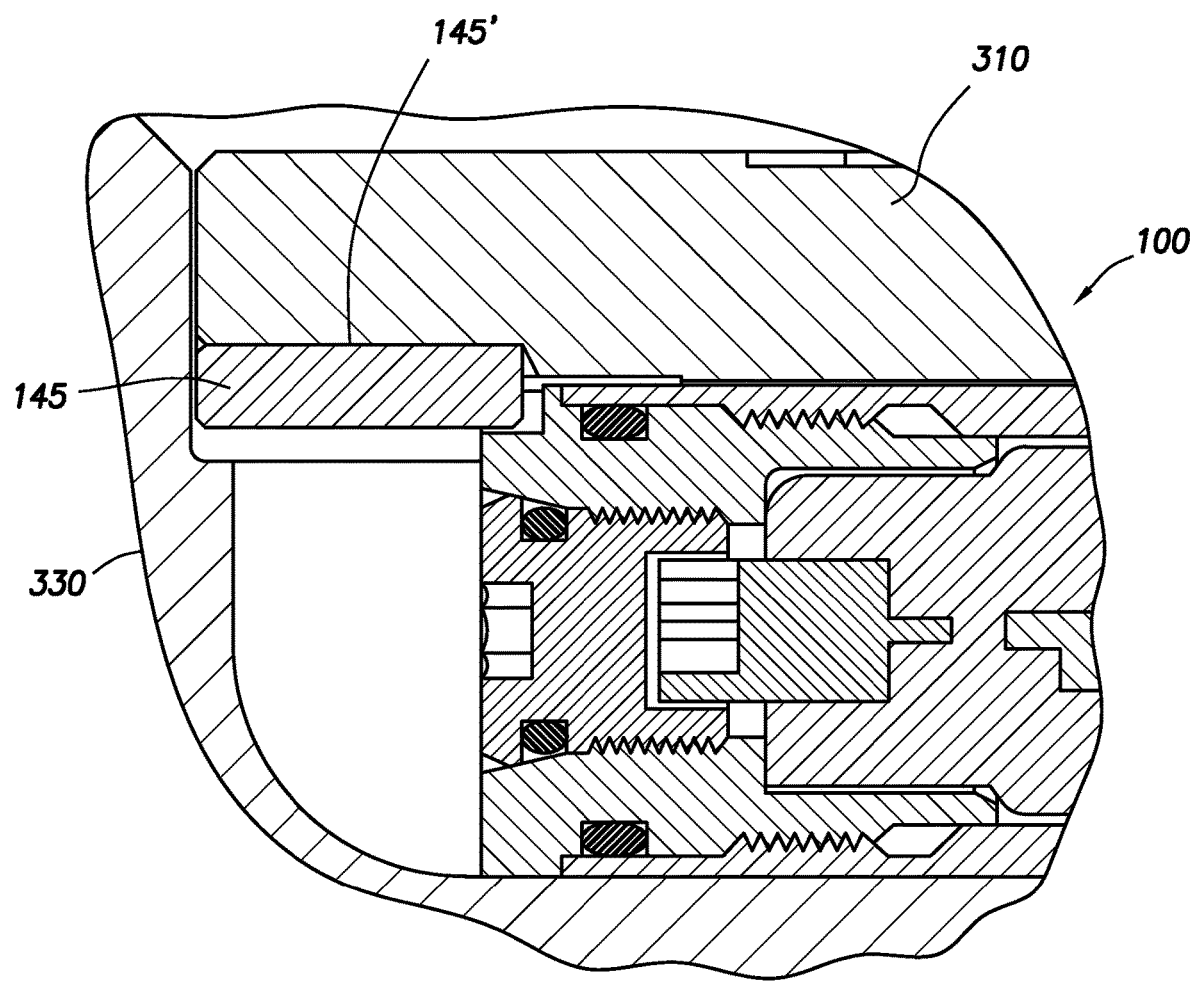
FIG. 1C is a partial cross-section of an integrated data recorder and hatch cover consistent with at least one embodiment of the present disclosure.

As shown in FIG. 1A, integrated data recorder may be placed behind hatch cover 310 in slot 315 in tool 300. Slot 315 may be machined or drilled, for example, into outside surface 330 of tool 300. FIG. 1B depicts the relative size of integrated data recorder 100 consistent with certain embodiments of the present disclosure. The size of integrated data recorder 100 depicted in FIG. 1B is not limiting and may be of any size consistent with usage in tool 300. In some embodiments, as depicted in FIG. 1C, integrated data recorder 100 may include location pin 145. Location pin 145 may engage with locator slot 145' of hatch cover 310. In some embodiments, location pin 145 may not be used. In some embodiments, hatch cover 310 may be at least partially formed from an electrically, magnetically, and/or electromagnetically transparent material.

Figure 2:
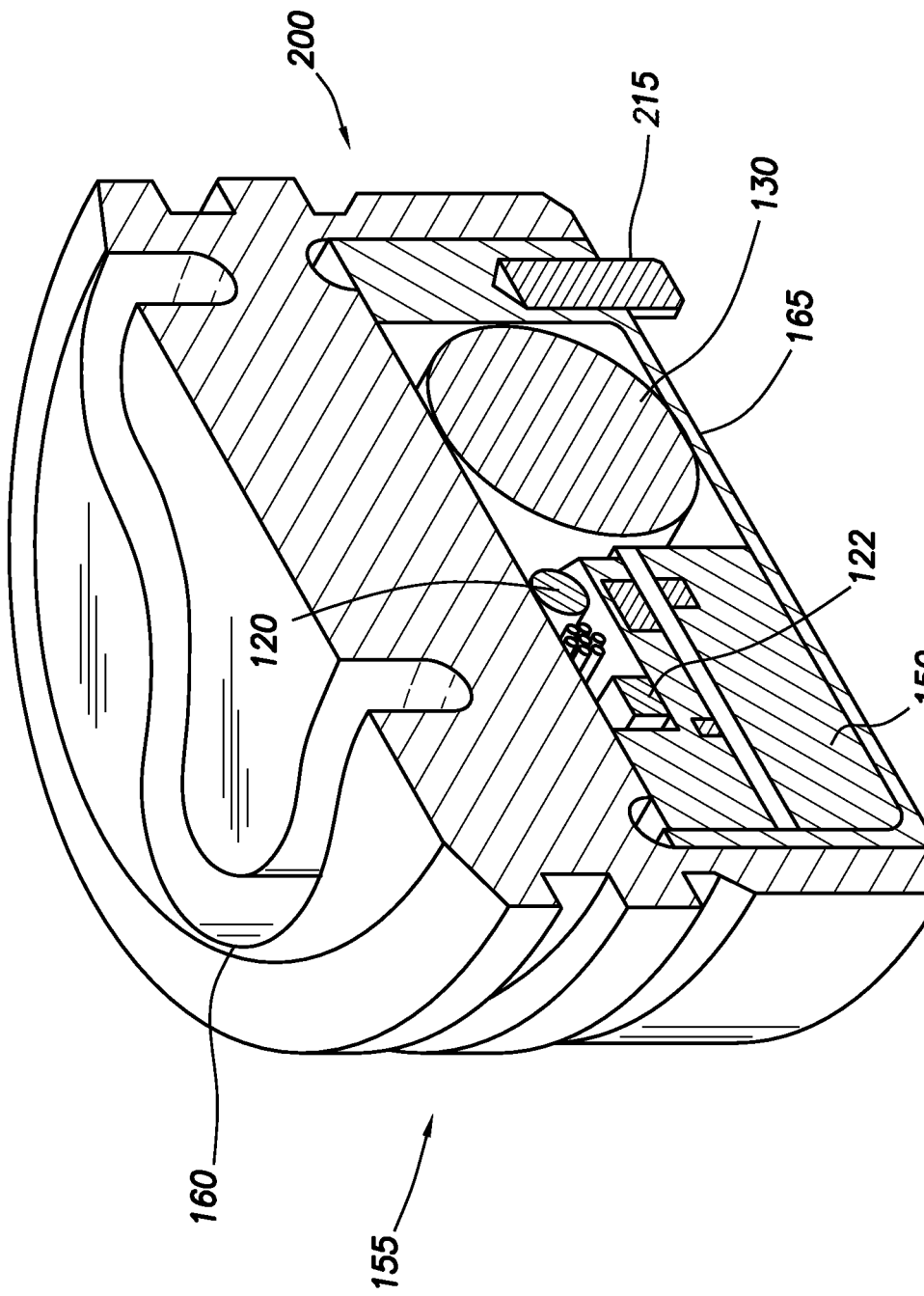
FIG. 2 depicts a cross section of an integrated data recorder consistent with at least one embodiment of the present disclosure.

FIG. 2 depicts integrated data recorder 200 consistent with certain embodiments of the present disclosure. The embodiment of integrated data recorder 200 shown in FIG. 2 is a "hockey-puck" design. Integrated data recorder 200 includes communication port 120, wireless communications module 122, and electrical energy source 130. Integrated data recorder 200 also includes data/sensor module 150. Data/sensor module 150 may include a processor, sensor package containing sensors, and memory module, as those elements are described above with respect to integrated data recorder 100. Data/sensor module 150 may be in data communication with communication port 120.

The hockey-puck design of integrated data recorder 200 depicted in FIG. 2 may include disk 155. In some embodiments, disk 155 may include recorder cap 160 and recorder carrier 165. In some embodiments, disk 155 may include recorder cap 160 without recorder carrier 165. In some embodiments, one or both of recorder cap 160 and recorder carrier 165 may be formed from a generally electrically, magnetically, and/or electromagnetically transparent material. In some embodiments, for example and without limitation, recorder cap 160 or recorder carrier 165 may be formed from one or more of a polymer such as polyether ether ketone (PEEK), high-temperature rubber, high-temperature plastic, or high-temperature ceramic material. Depending on the operating conditions to which integrated data recorder 200 will be subjected, a material having high resilience, high mechanical, chemical, and temperature resistance may be used. For example, integrated data recorder 200 used in an oil or gas wellbore may encounter higher temperatures, pressures, and chemical reactivity than integrated data recorder 200 used in a drilling, geothermal drilling, coring, or mining operation, and may, accordingly, be built of more resilient materials. In certain embodiments, communication port 120 may be positioned within disk 155, accessible by removing recorder cap 160 from recorder carrier 165. In some embodiments, integrated data recorder 200 may include location pin 215 formed as part of or mechanically coupled to recorder carrier 165. In some embodiments, location pin 215 may not be used. In some embodiments, communication port 120 may be positioned proximate to or within location pin 215.

Figure 2A:
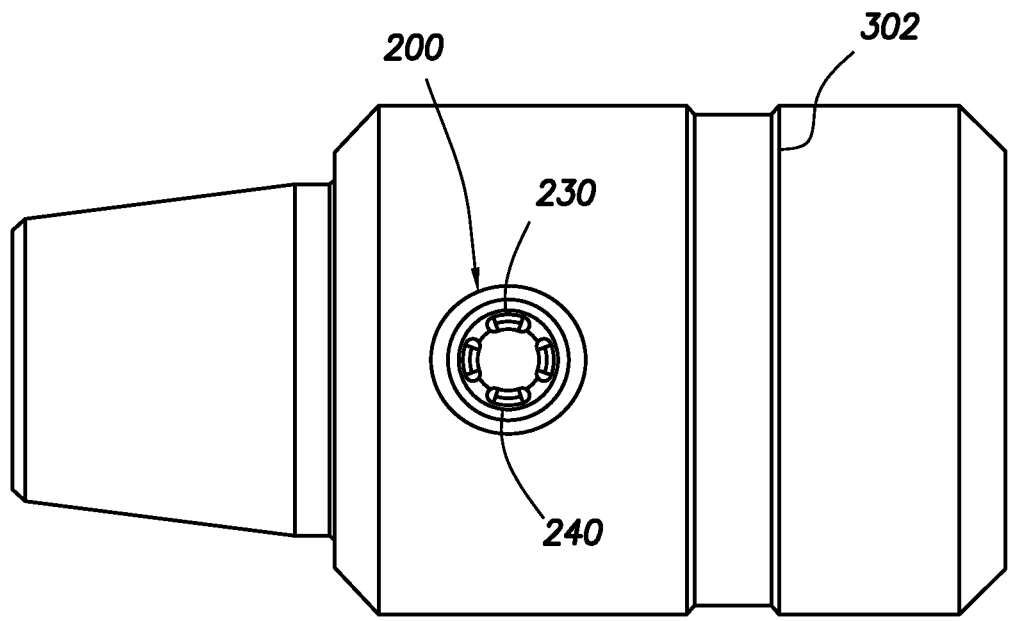
FIG. 2A depicts the integrated data recorder of FIG. 2 within a tool consistent with at least one embodiment of the present disclosure.

Integrated data recorder 200 may be positioned within any tool 300 as described herein above with respect to integrated data recorder 100. As a non-limiting example of an embodiment of the present disclosure, FIG. 2A depicts integrated data recorder 200 within bit sub 302 of, for example and without limitation, a motor mandrel. As depicted in FIGS. 2C, 2D, bit sub 302 may be mechanically coupled to motor mandrel 305. Motor mandrel 305 may include pin-down lower coupler 307a as depicted in FIG. 2C, or may include box-down lower coupler 307b as depicted in FIG. 2D. In certain embodiments, integrated data recorder 200 may be positioned within screw housing 230. Screw housing may include screw housing threads for threadedly connecting to threaded slot 240, as shown in FIG. 2A. The hockey-puck design of integrated data recorder 200 may be used, for example and without limitation, in areas with limited space such as a motor mandrel bit box, a steerable tool bit box, a vertical drilling tool bit box, a steerable tool upper mandrel, a vertical drilling tool upper mandrel, stabilizer, ball seat, a shank of a drill bit, a kelly, a saver sub, a tool joint connection clamp, or a quill of a top drive. In some embodiments, integrated data recorder 100 or 200 may be used in any of these tools.

Figure 2B:
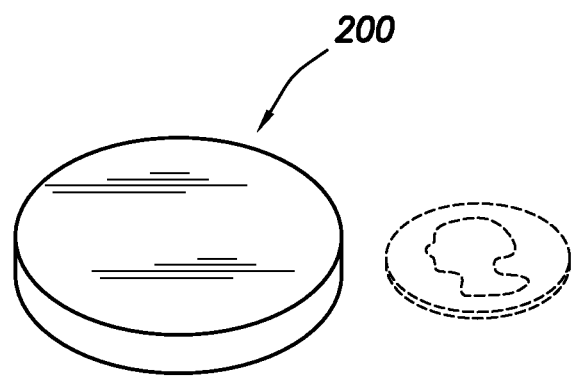
FIG. 2B depicts the integrated data recorder of FIG. 2.

FIG. 2B depicts the relative size of integrated data recorder 200 consistent with certain embodiments of the present disclosure. The size of integrated data recorder 200 depicted in FIG. 2B is not limiting and may be of any size consistent with usage in tool 300.

In certain embodiments, integrated data recorder 100 and integrated data recorder 200 may be self-contained in that while recording data, no power is supplied from outside integrated data recorder 100 or integrated data recorder 200, respectively. In other embodiments, electrical power may be supplied from outside integrated data recorder 100 and 200, such as from a self-contained, separate electrical power module such as, for example, batteries.

Figure 14:
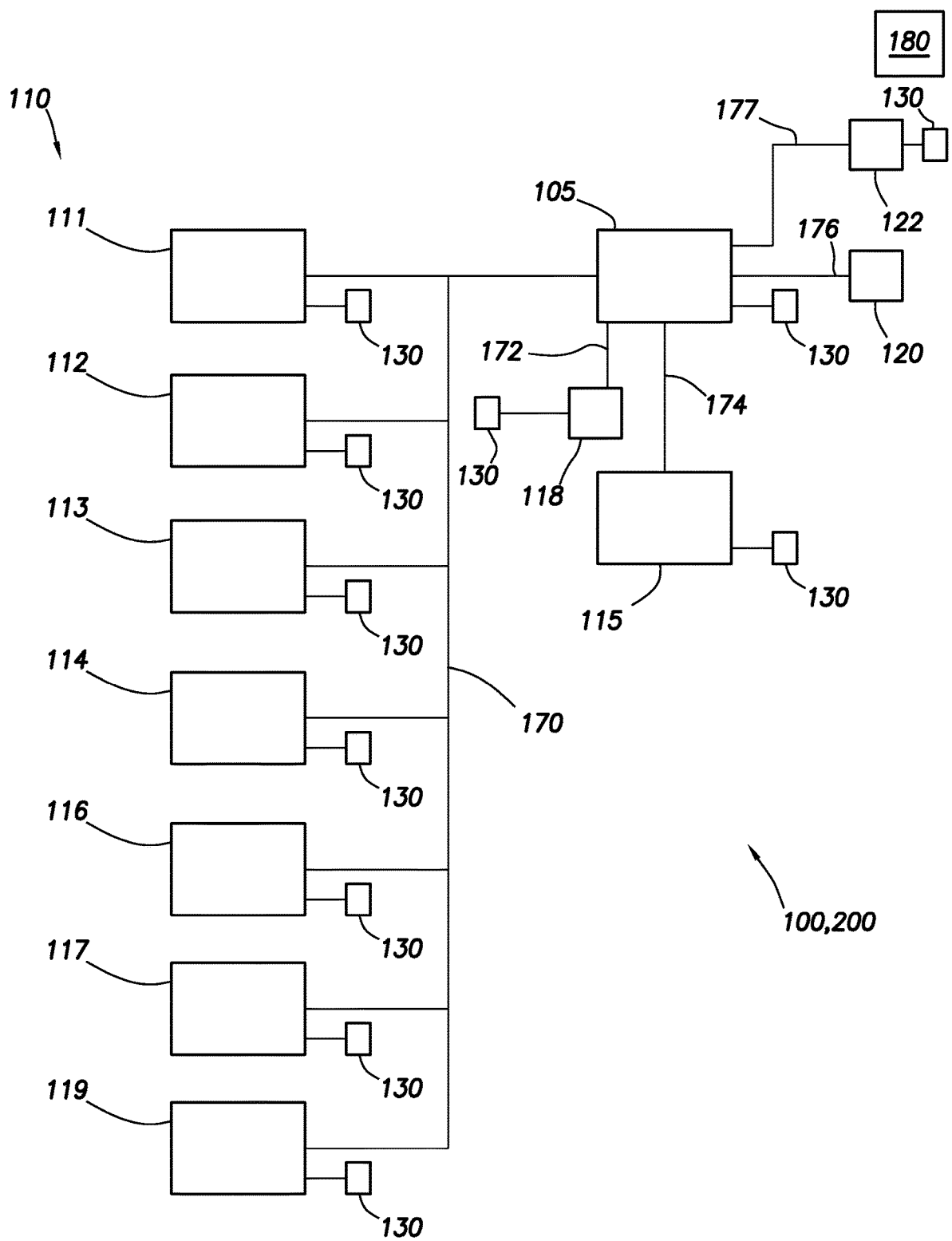
FIG. 14 is a block diagram of an integrated data recorder consistent with at least one embodiment of the present disclosure.

FIG. 14 depicts a block diagram of integrated data recorder 100, 200. Integrated data recorder includes sensor package 110 which includes one or more sensors. In the embodiment shown in FIG. 14, the sensors may include one or more of low-g accelerometer 111, high-g accelerometer 112, gyroscope 113, and temperature sensor 114. In some embodiments, such as the embodiment shown in FIG. 14, the sensors may also include one or more of magnetometer 116, pressure sensor 117, and strain gauge 119. In other embodiments, sensor package 110 may include any of sensors 111, 112, 113, 114, 116, 117, and 119. Sensors 111, 112, 113, 114, 116, 117, and 119 may be in data communication with processor 105 through sensor communication bus 170. Sensor communication bus 170 may be a digital communication bus, such as an SPI (Serial Peripheral Interface) bus or an I²C (Inter-Integrated Circuit) bus.

In certain embodiments, Hall-effect sensor 118 may be in data communication with processor 105 through Hall-effect sensor bus 172. Hall-effect sensor bus 172 may be a digital communication bus, such as an SPI or an I²C bus. In some embodiments, Hall-effect sensor 118 is directly connected to processor 105 via an input port, for example, an interrupt pin or an analog-to-digital-converter pin. In other embodiments, Hall-effect sensor 118 may be a digital Hall-effect sensor or analog (ratio-metric) Hall-effect sensor. In other embodiments, Hall-effect sensor 118 may be omitted.

In the embodiment depicted in FIG. 14, memory module 115 is in data communication with processor 105 through memory communication bus 174. Memory communication bus 174 may be a CAN (Controller Area Network) bus, an SPI or an I²C bus in certain non-limiting examples. Thus, sensors 111, 112, 113, 114, 116, 117, and 119 are in data communication with memory module 115 through sensor communication bus 170, processor 105, and memory communication bus 174. Hall-effect sensor 118 is in data communication with memory module 115 through Hall-effect sensor bus 172, processor 105 and memory communication bus 174. Memory module 115 may contain multiple memory devices, such as between 2 and 8 memory devices or 4 memory devices. Each memory device may be a non-volatile memory medium, such as Flash or EEPROM (Electrically Erasable Programmable Read-Only Memory) device. One non-limiting example of EEPROM device is a 1-kbit SPI EEPROM, Model 25LC010A from Microchip (Chandler, Ariz., USA).

As further shown in FIG. 14, processor 105 is in data communication with communication port 120 through communication port bus 176. Communication port bus 176 may be a digital communication bus, including, but not limited to, a SCI (Serial Communication Interface) bus, a UART (Universal Asynchronous Receiver/Transmitter) bus, a CAN bus, a SPI bus or a I²C bus. Communication port 120 may be in data communication with memory module 115 through memory communication bus 174, processor 105, and communication port bus 176. One non-limiting example of processor 105 with such communication bus feature is a 16-bit microcontroller, Model SM470R1B1M-HT from Texas Instruments (Dallas, Tex., USA).

In some embodiments, as further shown in FIG. 14, processor 105 may be in data communication with wireless communications module 122 through wireless communication bus 177. Wireless communication bus 177 may be a digital communication bus, including, but not limited to, a SCI (Serial Communication Interface) bus, a UART (Universal Asynchronous Receiver/Transmitter) bus, a CAN bus, a SPI bus or a I²C bus. Wireless communications module 122 may be in data communication with memory module 115 through memory communication bus 174, processor 105, and wireless communication port bus 177. Wireless communications module 122 may, in some embodiments, allow for wireless communication between integrated data recorder 100 or integrated data recorder 200 and external device 180 as further discussed below. External device 180 may be, for example and without limitation, one or more of a computer, mobile device, personal computer, tablet, smartphone, external data logger, or other suitable system. Wireless communications module 122 may, for example and without limitation, allow for data from memory module 115 to be transmitted to external device 180 without physically interacting with integrated data recorder 100 or integrated data recorder 200. In some embodiments, external device 180 may upload or stream data from integrated data recorder 100, 200 to a remote location such as, for example and without limitation, a server or cloud network. In some embodiments, integrated data recorder 100 or integrated data recorder 200 may remain installed to tool 300 while data is retrieved from memory module 115. In some embodiments, wireless communications module 122 may, for example and without limitation, allow for data/commands from external device 180 to be received by processor 105 without physically interacting with integrated data recorder 100 or integrated data recorder 200. In some embodiments, the operational setting of integrated data recorder 100 or integrated data recorder 200 may be changed wirelessly. In some embodiments, external device 180 may be surface equipment with Internet connection or a downhole tool within a drillstring.

Wireless communications module 122 may use any wireless communication protocol for communicating between integrated data recorder 100, 200 and external device 180 including, for example and without limitation, one or more of WiFi, Bluetooth, Bluetooth low energy (BLE), ZigBee, Z-Wave, GSM (Global System for Mobile Communications), CDMA (Code-division multiple access), UMTS (Universal Mobile Telecommunications System), LTE (Long-Term Evolution), GPS (Global Positioning System), satellite communication, or any other wireless communication protocol.

In some embodiments, wireless communications module 122 may be a transceiver such that data or commands transmitted from external device 180 may be received by integrated data recorder 100 or integrated data recorder 200. In some such embodiments, external device 180 may send instructions to integrated data recorder 100 or integrated data recorder 200 to, for example and without limitation, configure one or more parameters of sensor package 110 or configure an operational mode of integrated data recorder 100 or integrated data recorder 200. In some embodiments, for example and without limitation, synchronization or calibration of sensors or other parameters of integrated data recorder 100 or integrated data recorder 200 may be accomplished using commands transmitted wirelessly from external device 180 to wireless communications module 122.

Figure 15:
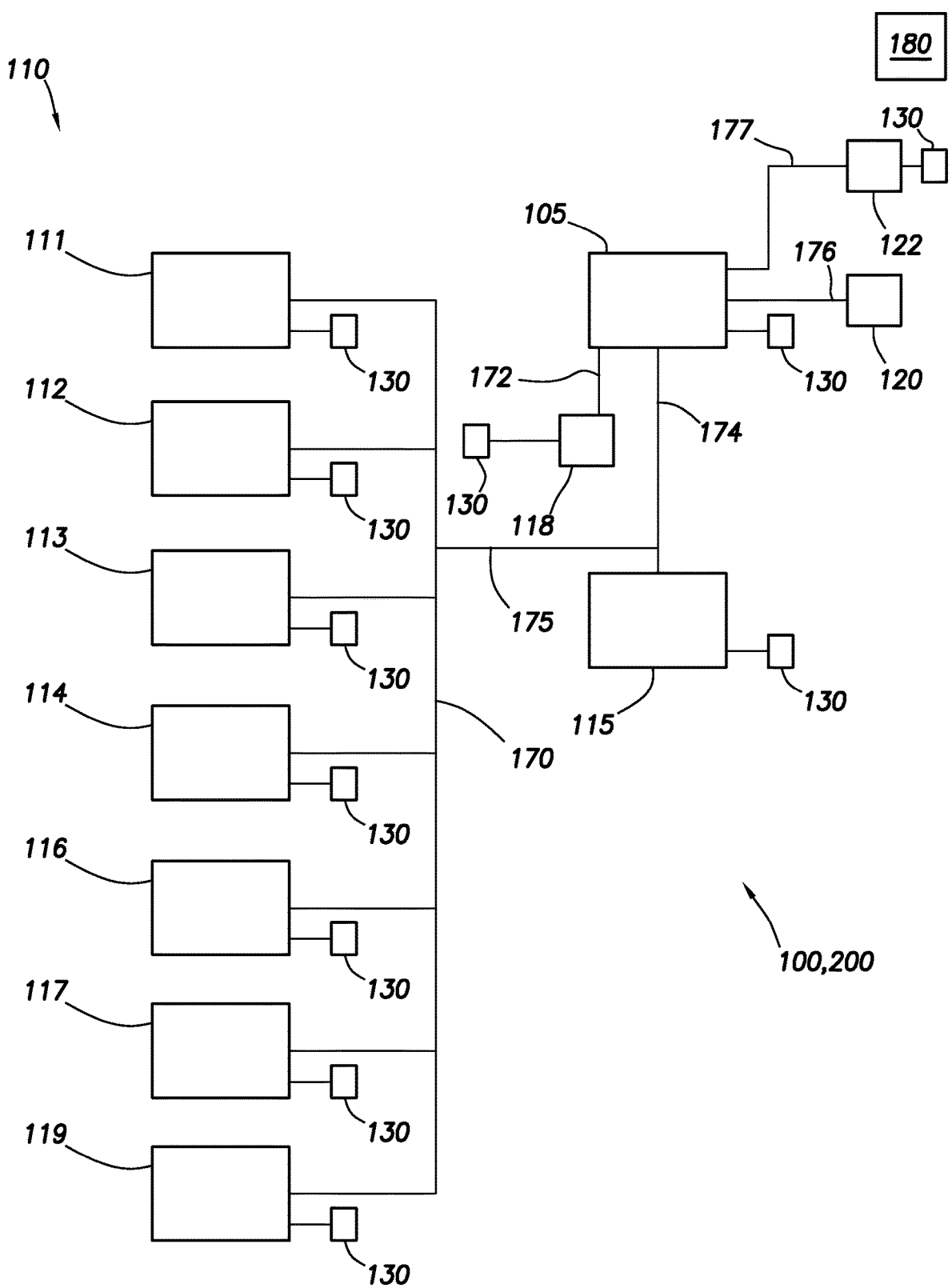
FIG. 15 is a block diagram of an integrated data recorder consistent with at least one embodiment of the present disclosure.

FIG. 15 depicts another embodiment of a block diagram of integrated data recorder 100, 200. In FIG. 15, sensor communication bus 170 and memory communication bus 174 are connected to form sensor-memory bus 175.

In the embodiments shown in FIGS. 14 and 15, electrical energy source 130 is in electrical connection with each of sensors 111, 112, 113, 114, 116, 117, 119, processor 105, memory module 115, and wireless communications module 122. In some embodiments, electrical energy source 130 may be electrically connected to each of sensors 111, 112, 113, 114, 116, 117, 119 directly. In other embodiments, electrical energy source 130 may be electrically connected to each of sensors 111, 112, 113, 114, 116, 117, 119 indirectly through a connection to sensor package 110. In yet other embodiments, electrical energy source 130 may be electrically connected to each of sensors 111, 112, 113, 114, 116, 117, 119 indirectly through a voltage regulator.

In some embodiments, communication port 120 may include a power bus used to provide power to recharge electrical energy source 130. In some embodiments, integrated data recorder 100, 200 may include one or more wireless charging apparatuses to, for example and without limitation, allow electrical energy source 130 to be charged without dismantling integrated data recorder 100, 200.

Figure 3:
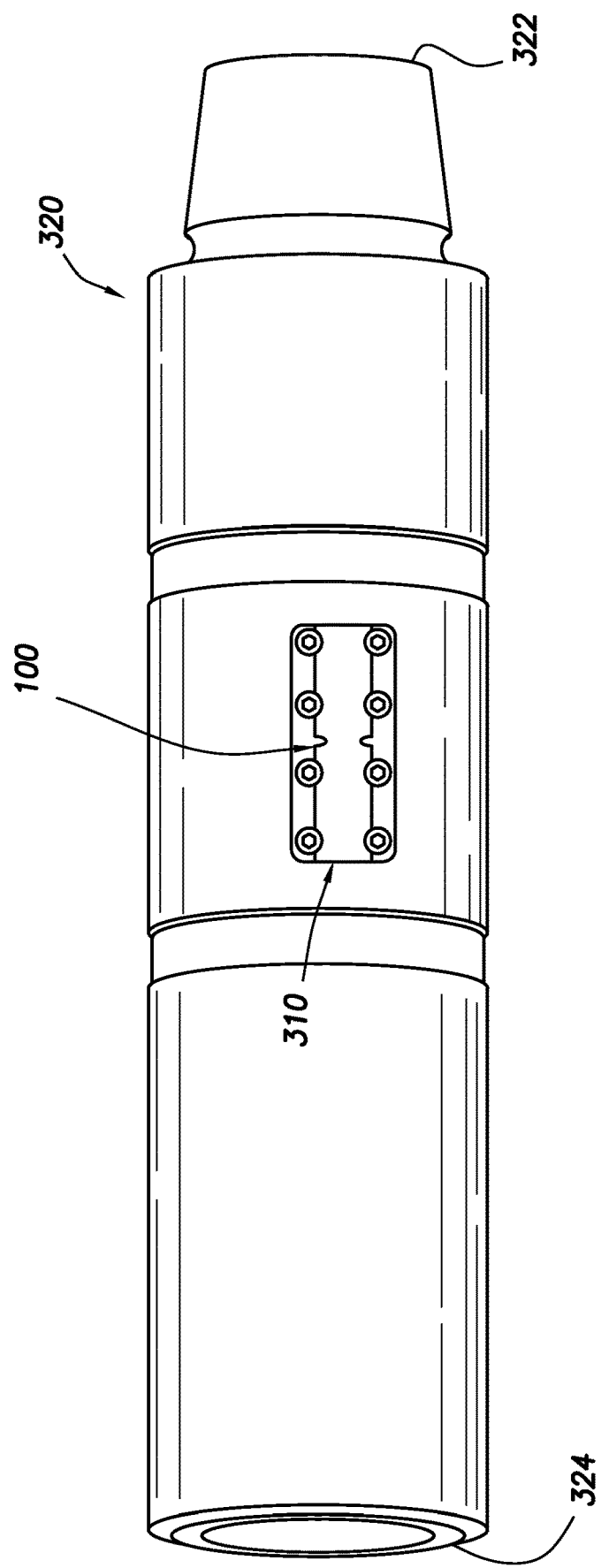
FIG. 3 depicts an integrated data recorder within a carrier sub consistent with at least one embodiment of the present disclosure.

In some embodiments, tool 300 into which integrated data recorder 100 or integrated data recorder 200 is integrated may be a downhole tool used as part of a drill or tool string positioned within a wellbore. As a nonlimiting example, FIG. 3 depicts integrated data recorder 100 within carrier sub 320 consistent with at least one embodiment of the present disclosure. In other embodiments, integrated data recorder 200 may be positioned within carrier sub 320. Carrier sub 320 may be inserted into a drill string, for examples and without limitation, between two joints of a drill string. In some embodiments, carrier sub 320 may be a bit sub. In some embodiments, carrier sub 320 may include male threaded connection 322 and female threaded connection 324 for threaded insertion into the drill string. Although not depicted, in other embodiments, carrier sub 320 may include two female threaded connections or two male threaded connections.

Integrated data recorder 100, 200 may be used with a variety of tools of which bit sub 302 is a part. In one non-limiting example, integrated data recorder 100 may be used with mud motor 400, as shown in FIG. 4. Mud motor 400 may include rotor catch 410 within a top sub, transmission 430 and bit box 450. As shown in FIG. 4, rotor catch recorder 425 may be positioned within rotor catch slot 420, located, for instance, proximate rotor catch 410, and bit box recorder 465 may be positioned in bit box slot 460, located proximate bit box 450. In certain embodiments, such as shown in FIG. 4, transmission recorder 445 may be positioned within transmission slot 440 located proximate transmission 430. Although depicted at an upper end of transmission 430, transmission slot 440 and transmission recorder 445 may be positioned at any position within transmission 430, including, for example and without limitation, at a lower end of transmission 430 as depicted in FIG. 4A. Rotor catch recorder 425, bit box recorder 465 and transmission recorder 445 may include sensors for measuring lateral and axial shock and vibration, string and drill bit RPM, toolface, inclination, total gravity field, temperature, radial acceleration, tangential acceleration, and combinations thereof, for example.

FIG. 5 depicts another embodiment of the use of integrated data recorder 100, 200 in conjunction with mud motor 400 (shown in FIGS. 5A and 5B, respectively). In the embodiment depicted in FIG. 5, integrated data recorder 100 may be used for top sub recorder 485, positioned in top sub 480 and integrated data recorder 200 may be used for bit box recorder 465, positioned in bit box threaded slot 462.

Figure 6:
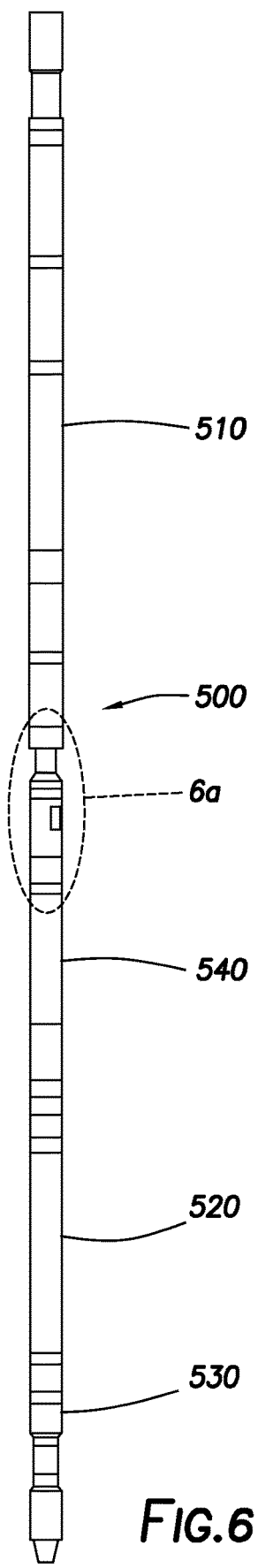
FIG. 6 depicts an integrated data recorder within a friction reduction tool consistent with at least one embodiment of the present disclosure.
Figure 6A:
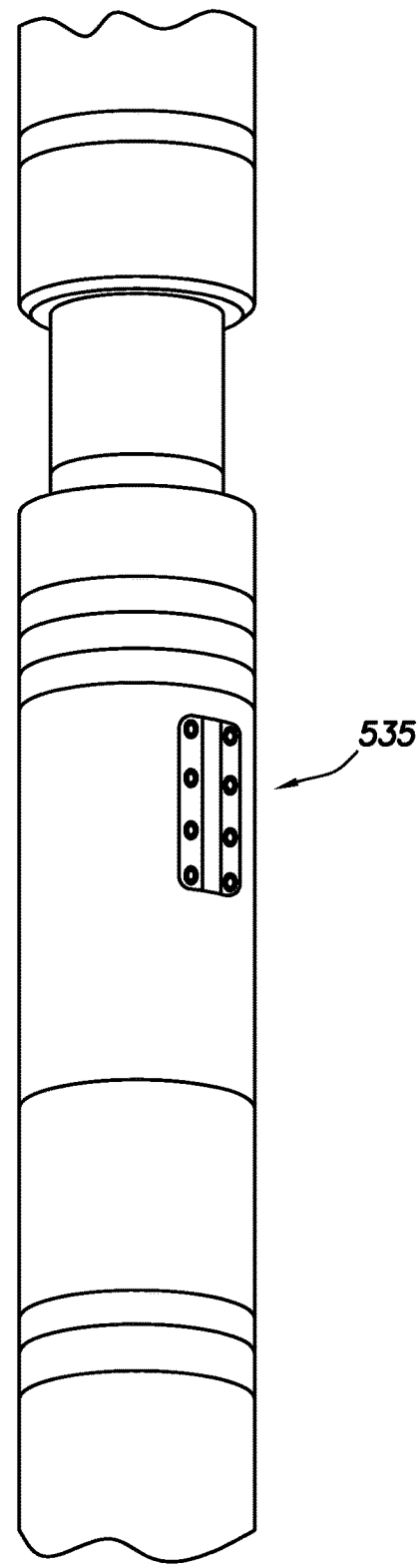
FIG. 6A depicts an integrated data recorder within the friction reduction tool of FIG. 6 consistent with at least one embodiment of the present disclosure.

In another embodiment, integrated data recorder 100, 200 may be used in conjunction with a friction reduction tool. Non-limiting examples of friction reduction tools may be found in U.S. Pat. No. 6,585,043 entitled "Friction Reducing Tool" and U.S. Pat. No. 7,025,136 entitled "Torque Reduction Tool," which are incorporated herein by reference. FIG. 6 depicts one embodiment of the use of integrated data recorder 100 in friction reduction tool 500. Friction reduction tool 500 may include amplifier section 510 in mechanical connection with pulser section 520. Pulser section may include valve section 540 in mechanical and fluid and/or electrical connection with power section 530. In the embodiment shown in FIGS. 6 and 6A, integrated data recorder 100 may be positioned in friction reduction recorder slot 535. Sensors within friction reduction recorder data dynamics recorder may be used to determine the frequency and intensity of operation of friction reduction tool 500. Friction reduction recorder slot 535 may be located within pulser section 520 or amplifier section 510. As shown in FIG. 6, friction reduction recorder slot 535 is positioned within amplifier section 510.

Figure 7:
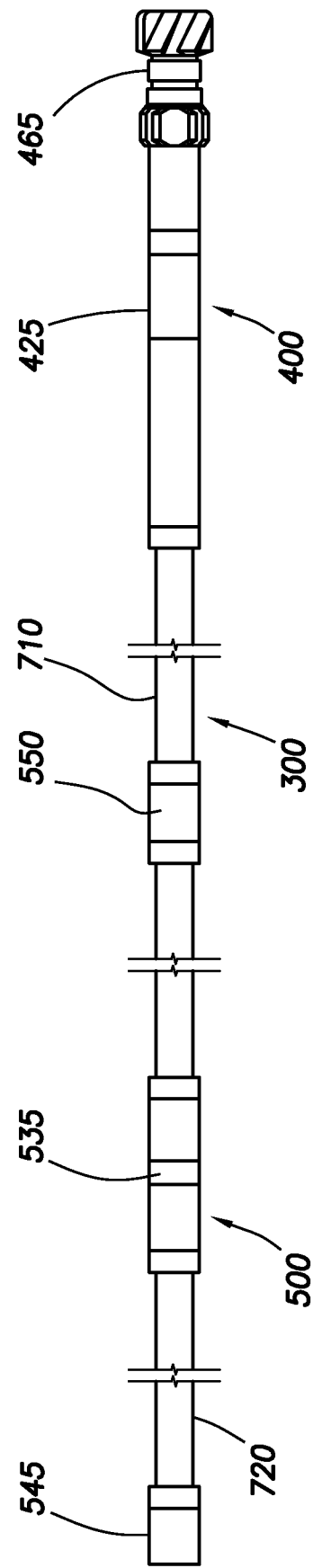
FIG. 7 depicts integrated data recorders within a friction reduction tool and carrier subs consistent with at least one embodiment of the present disclosure.

Integrated data recorder 100, 200 within carrier sub 320 may be used in conjunction with a variety of tool subcomponents that make up tool 300. In one non-limiting example, integrated data recorder 100 may be used with a friction reduction tool, as shown in FIG. 6 and a mud motor, as shown in FIG. 5. As discussed above with respect to mud motor 400, one or more of rotor catch recorder 425, top sub recorder 485, and bit box recorder 465 may be positioned in mud motor 400. Friction reduction recorder slot 535 may be positioned within friction reduction tool 500. As shown in FIG. 7, friction reduction tool 500 and mud motor 400 may be mechanically coupled by intermediate drill string section 710. Intermediate carrier sub 550 containing integrated data recorder 100 may be positioned within intermediate drill string section 710. In certain embodiments, as shown in FIG. 7, upper carrier sub 545 may be positioned within upper drill string section 720. The sensors within integrated data recorders 100 within upper carrier sub 545 and intermediate carrier sub 550 may be used to gather data to evaluate transmission of oscillation through bit box 450 and the drill string.

Figure 8B:
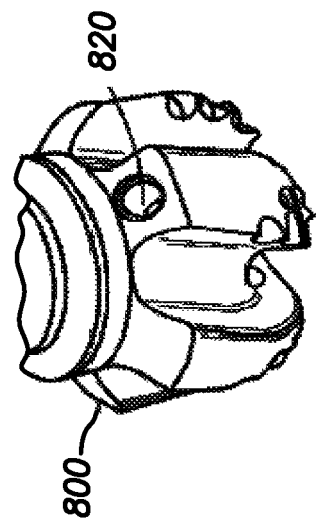
FIGS. 8A-8D depict slots for integrated data recorders within different portions of a drill bit consistent with embodiments of the present disclosure.
Figure 8A:
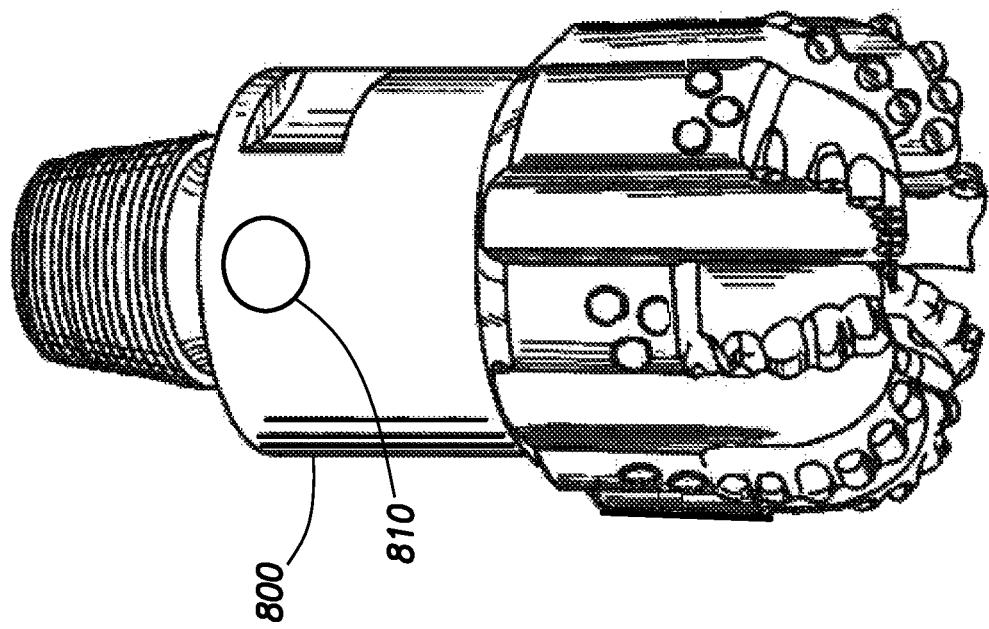
Figure 8D:
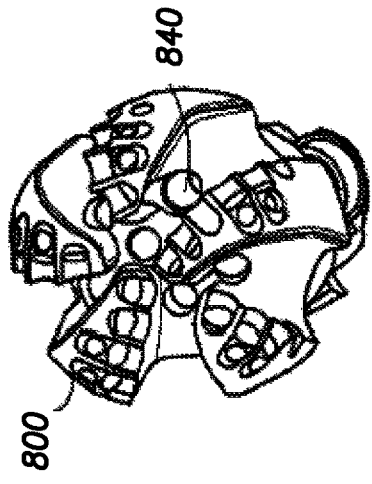
Figure 8C:
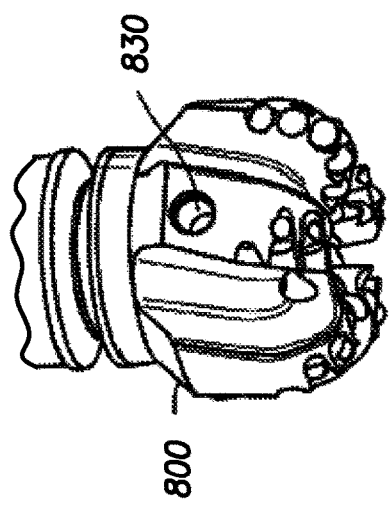

In another embodiment, integrated data recorder 100, 200 may be positioned within a drill bit. In some embodiments, the sensors within integrated data recorder 100, 200 may be used to determine bit dynamics and the operating condition of the bit. FIGS. 8A-8D depict locations in which integrated data recorders 100 may be positioned within drill bit 800. FIG. 8A depicts shank slot 810. FIG. 8B depicts blade shoulder threaded slot 820. FIG. 8C blade threaded slot 830. FIG. 8D depicts body threaded slot 840. Although depicted as a drilling bit, drill bit 800 may be any type of drill bit for use in forming a bore including, for example and without limitation, a roller cone bit, PDC bit, coring bit, geothermal drilling bit, or mining bit as understood in the art.

Figure 9:
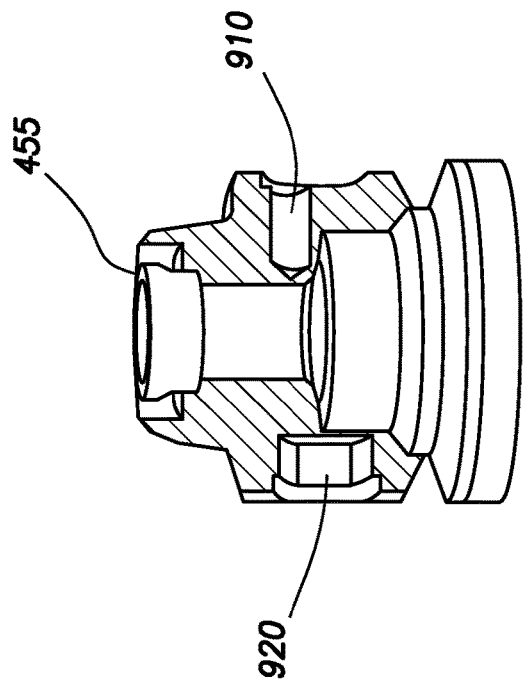
FIG. 9 depicts slots for integrated data recorders within a drill bit shank consistent with embodiments of the present disclosure.

FIG. 9 depicts slots for use with integrated data recorder 100, 200 within drill bit shank 455. In the example shown in FIG. 9, slot 910 and threaded slot 920 are shown for use with integrated data recorder 100, 200, respectively.

Figure 10B:
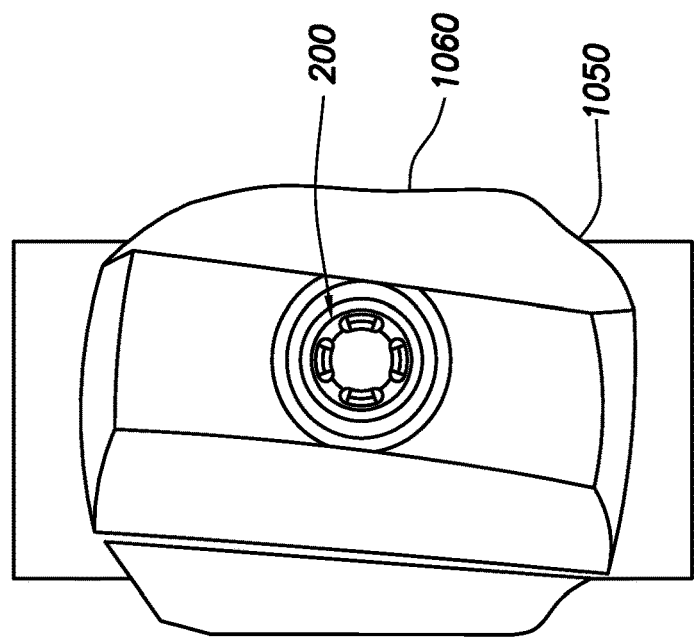
FIGS. 10A and 10B depict integrated data recorders in stabilizers consistent with certain embodiments of the present disclosure.
Figure 10A:
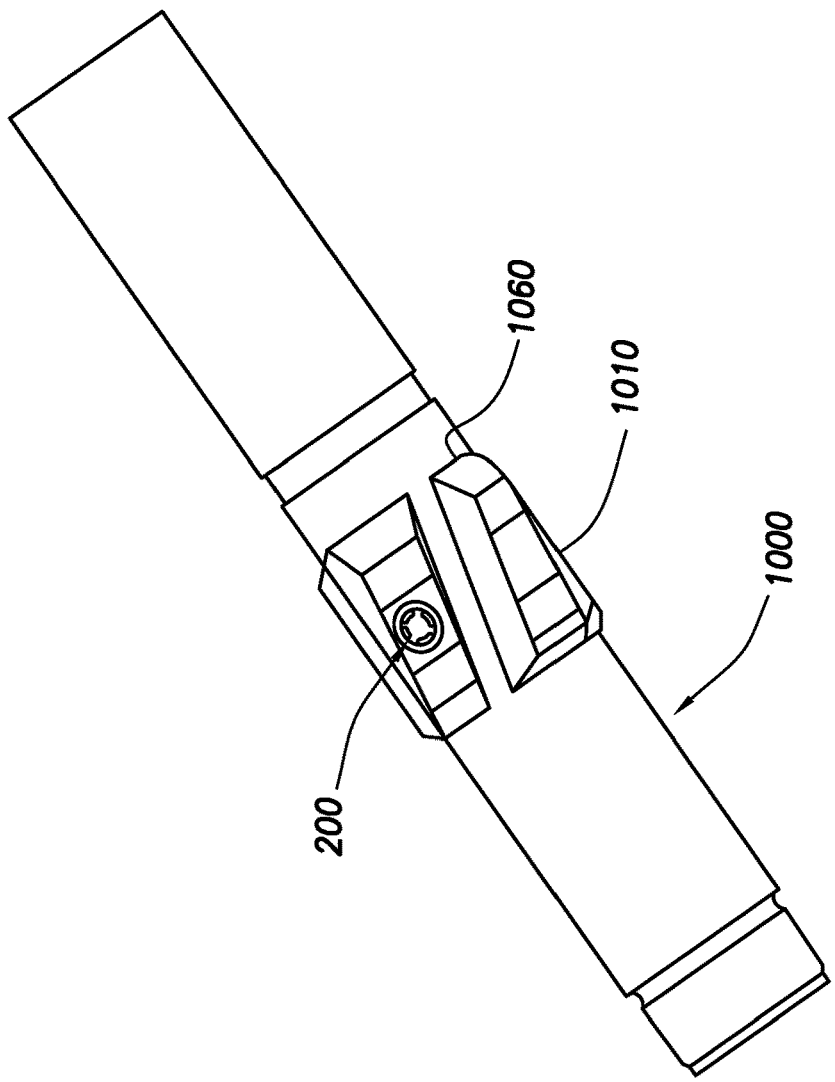

FIGS. 10A and 10B depict integrated data recorder 200 in near-bit stabilizer 1000 and stabilizer 1050, respectively for use in, for example, a coring or drilling assembly. FIG. 10A depicts integrated data recorder 200 positioned in blade 1060 of stabilizer body 1010. In some embodiments, integrated data recorder 200 may be positioned in between adjacent blades 1060 in stabilizer body 1010. FIG. 10B depicts integrated data recorder 200 positioned in blade 1060.

Figure 11:
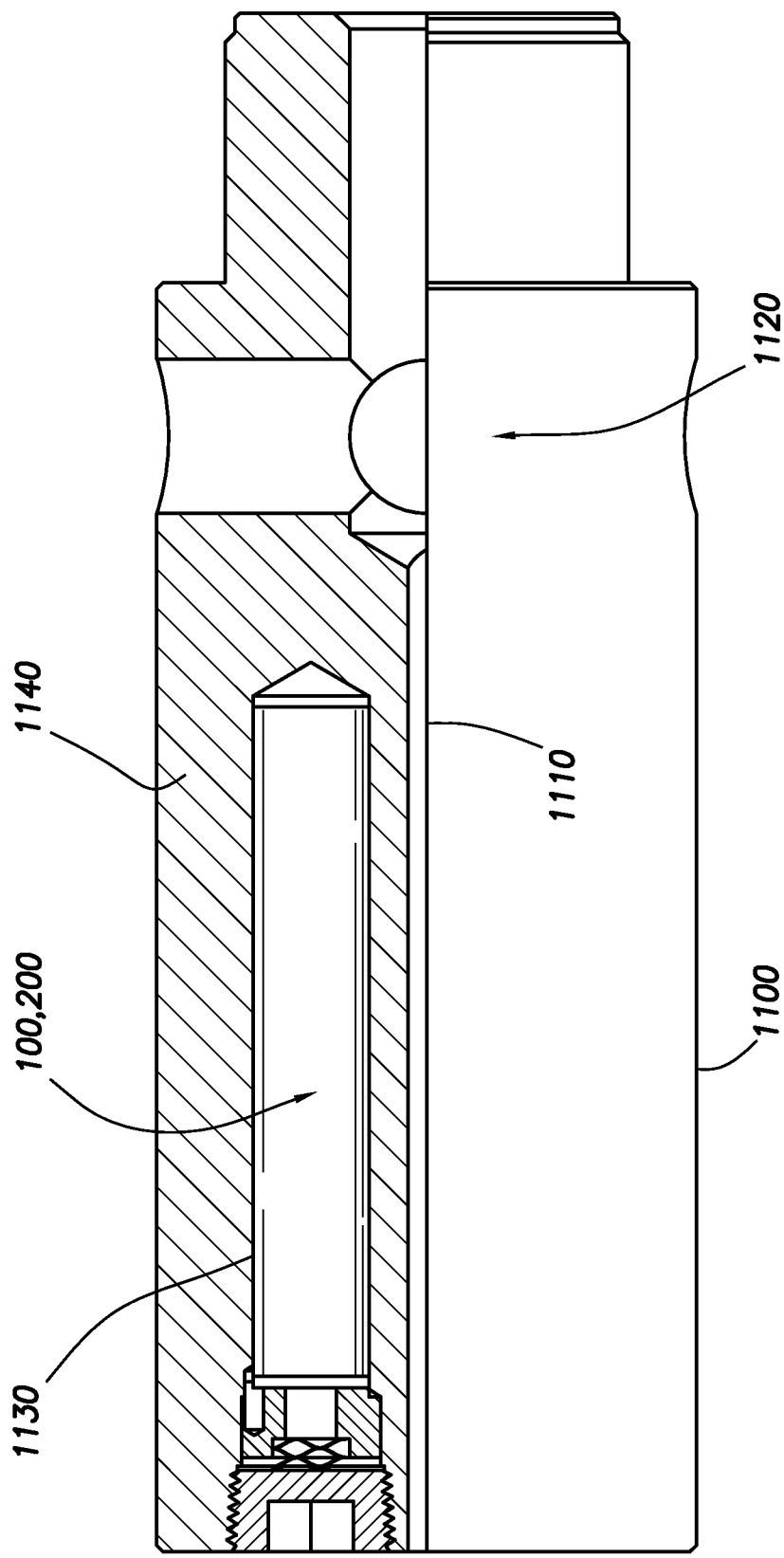
FIG. 11 depicts a ball seat assembly having an integrated data recorder consistent with certain embodiments of the present disclosure.

FIG. 11 depicts ball seat assembly 1100 for use, for example, with a coring assembly. Ball seat assembly 1100 includes inner bore 1110 in which ball seat 1120 is positioned. In the embodiment shown in FIG. 11, integrated data recorder 100, 200 may be positioned within ball seat slot 1130 formed within ball seat outer wall 1140 proximate ball seat 1120. In certain embodiments, integrated data recorder 100, 200 may be positioned within near-bit stabilizer 1000, 1050 as discussed herein above, and another integrated data recorder 100, 200 positioned within ball seat assembly 1100. The integrated data recorder 100, 200 within near-bit stabilizer 1000, 1050 may measure shock, vibration, rotation speed (in RPM), inclination, toolface, total gravity field, radial acceleration, tangential acceleration or a combination thereof, for example. Sensor measurements taken by sensors within near-bit stabilizer 1000, 1050 in combination with sensor measurements taken by sensors within ball seat assembly 1100 may determine drilling dynamics throughout the coring assembly. In some embodiments, outer wall 1140 may be formed at least partially from an electrically, magnetically, and/or electromagnetically transparent material aligned with integrated data recorder 100, 200

Figure 12:
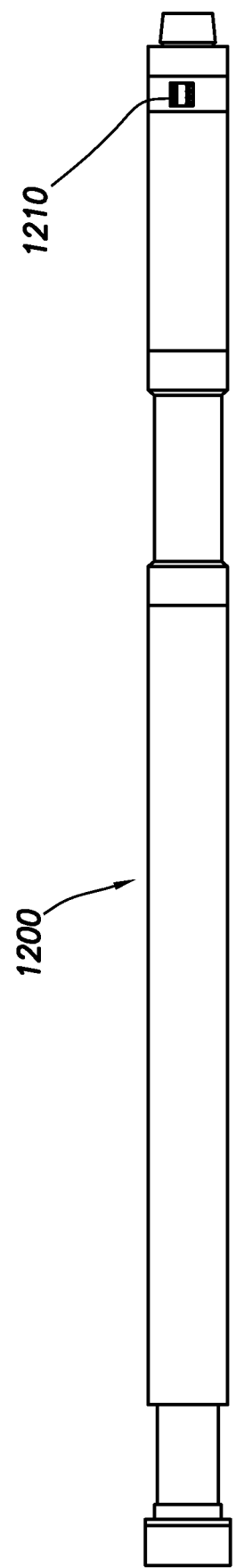
FIG. 12 depicts a stick-slip mitigation tool having an integrated data recorder consistent with certain embodiments of the present disclosure.
Figure 13:
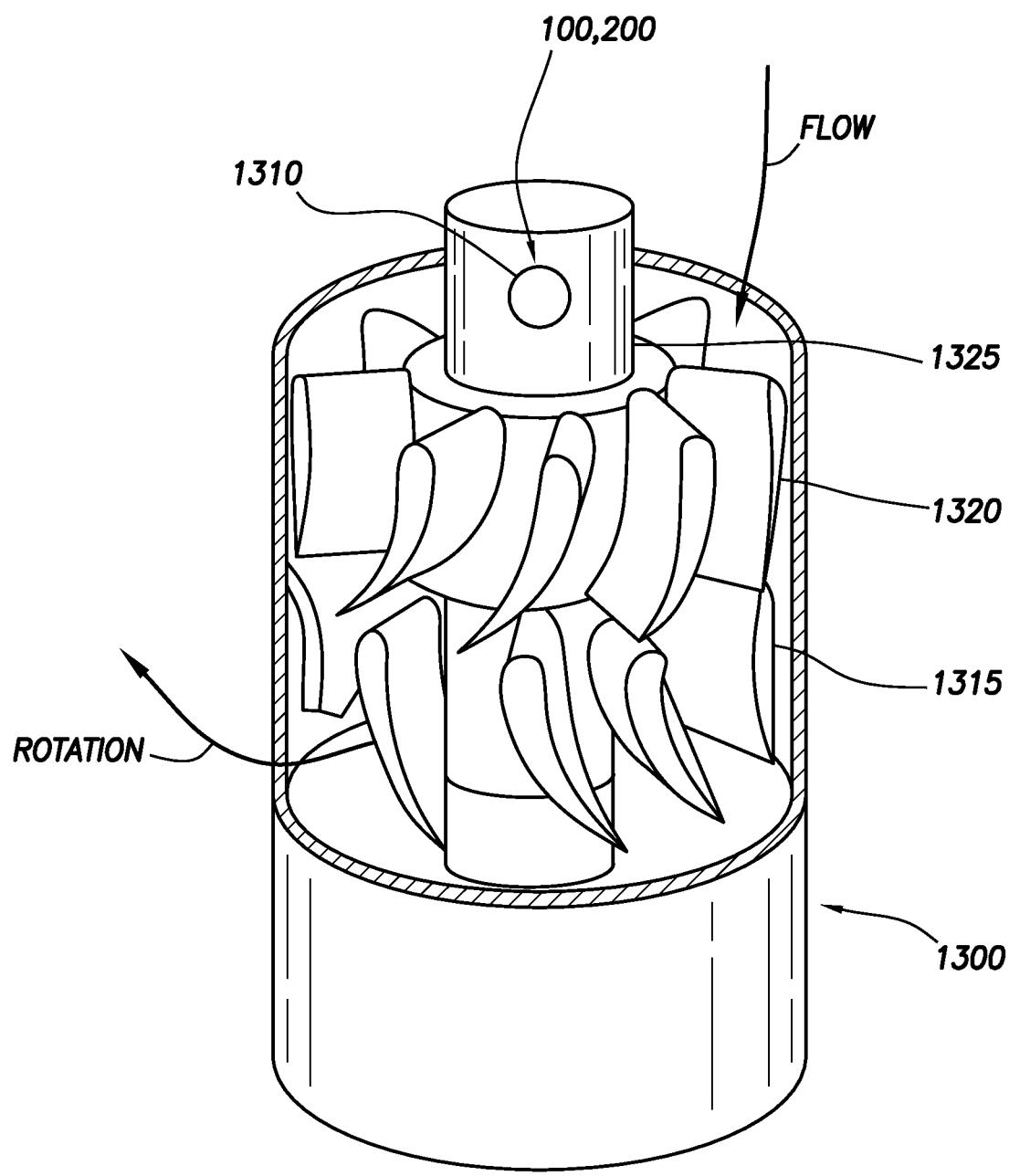
FIG. 13 depicts a turbine having an integrated data recorder consistent with certain embodiments of the present disclosure.

FIG. 12 depicts integrated data recorder 100, 200 positioned within stick-slip mitigation tool 1200 in stick-slip tool slot 1210. Stick-slip mitigation tool 1200 may also be referred to as a constant weight-on-bit tool. FIG. 13 depicts integrated data recorder 100, 200 positioned within turbine 1300 in turbine slot 1310. In some embodiments, integrated data recorder 100, 200 may be positioned within rotor 1315, stator 1320, or output shaft 1325 of turbine 1300.

Figure 16:
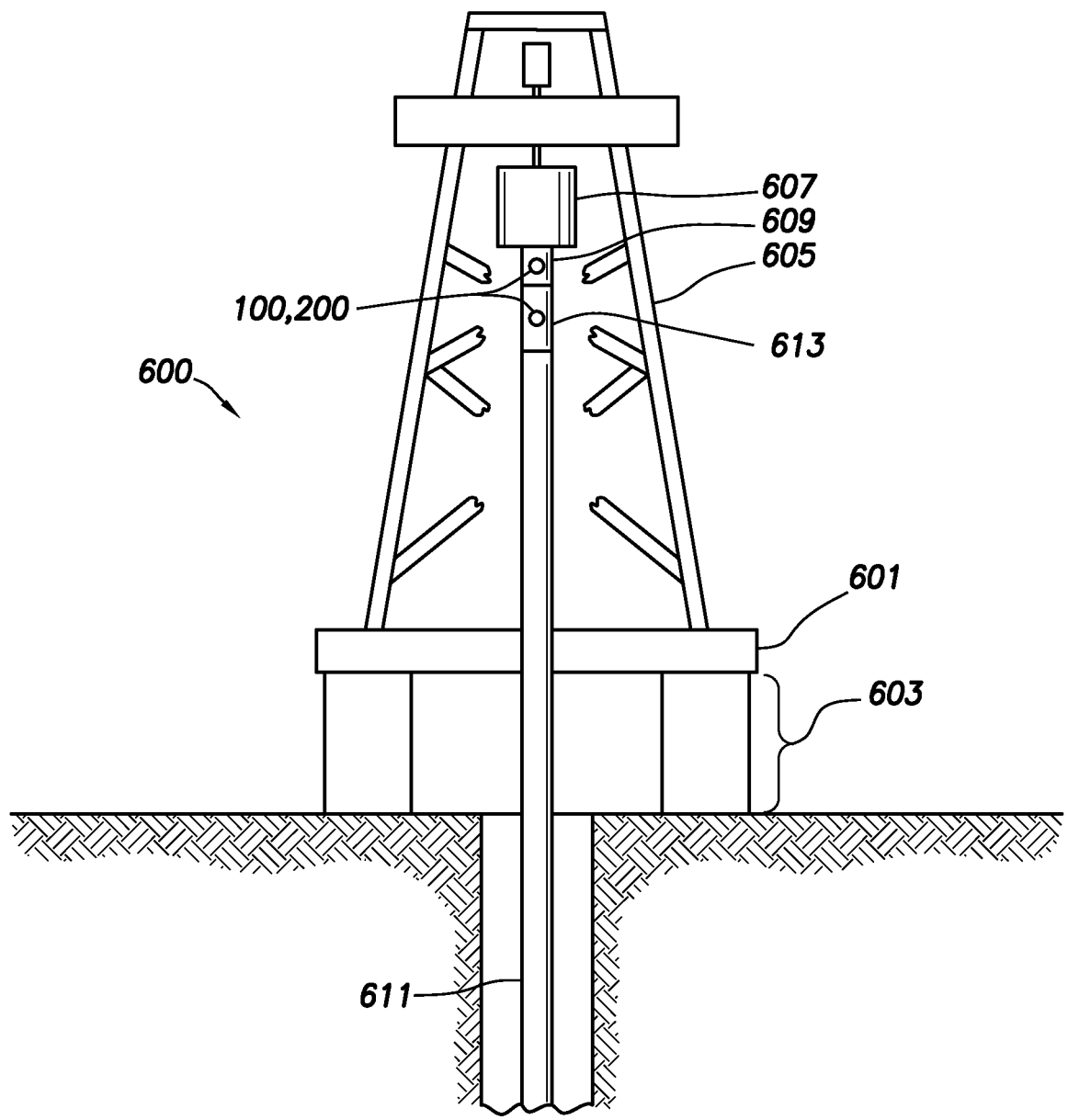
FIG. 16 is a schematic view of a drilling rig including an integrated data recorder consistent with at least one embodiment of the present disclosure positioned in components thereof.

In some embodiments, tool 300 into which integrated data recorder 100 or integrated data recorder 200 is integrated may be a surface tool used as part of a drill or tool string or may be coupled to a piece of equipment used with the drill string. As a nonlimiting example, FIG. 16 depicts drilling rig 600, which may be a drilling rig, geothermal drilling rig, coring rig, or mining rig. Drilling rig 600 may include rig floor 601, substructure 603, and mast 605. In some embodiments, drilling rig 600 may include top drive 607. Top drive 607 may include quill 609. Quill 609 may couple to the top of the drill string, depicted as drill string 611, and may be used to rotate drill string 611 during a drilling operation. Top drive 607 may also be used to move drill string 611 vertically within the wellbore. In some embodiments, quill 609 may couple directly to drill string 611 or may, as depicted in FIG. 16, couple to drill string 611 through saver sub 613. In some embodiments, one or more integrated data recorders 100, 200 may be positioned within one or more components of drilling rig 600 including, for example and without limitation, quill 609 of top drive 607 or within saver sub 613. In some embodiments, integrated data recorder 100 may be at a constant communication with external device 180, which may be a surface device.

Figure 16A:
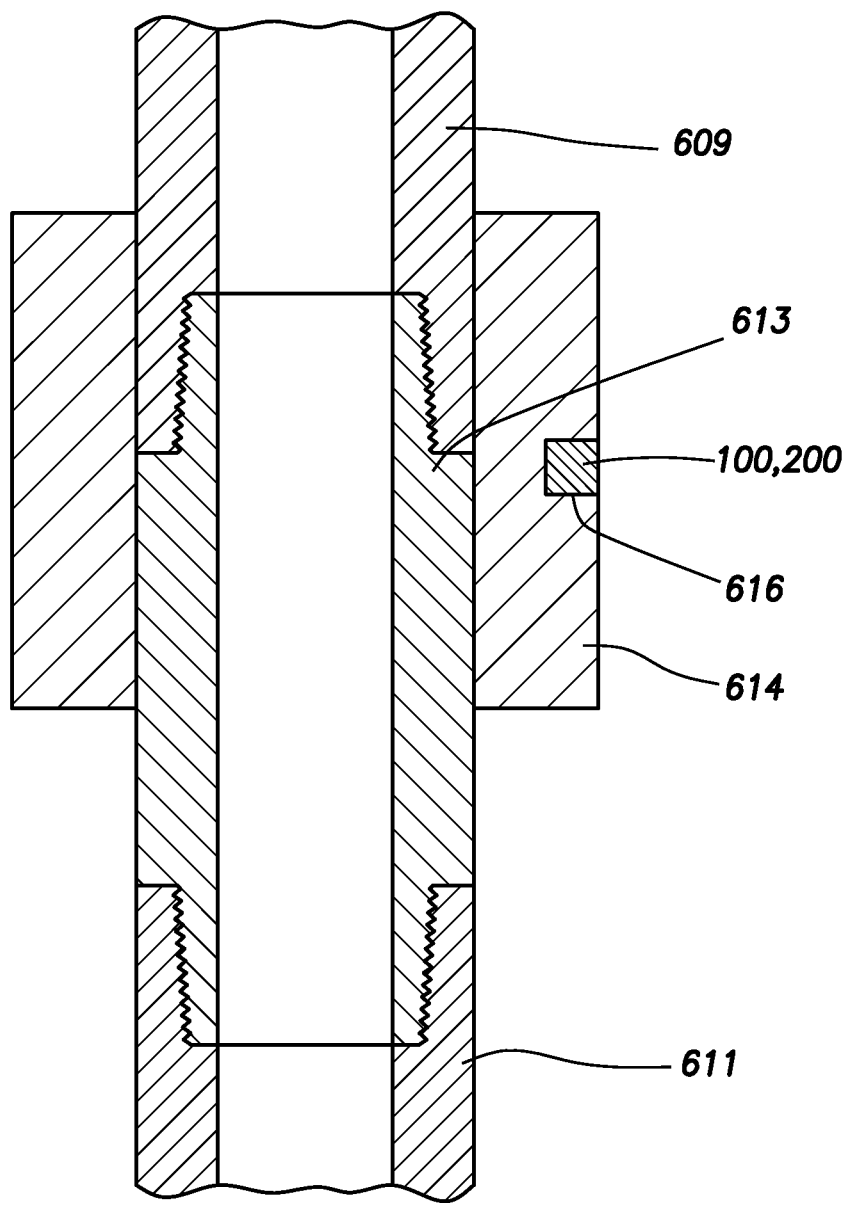
FIG. 16A is a detail cross section view of a connection between a quill and saver sub including a tool joint clamp and integrated data recorder consistent with at least one embodiment of the present disclosure.

In some embodiments, as shown in FIG. 16A, tool joint clamp 614 may be used at the connection between quill 609 and saver sub 613. Tool joint clamp 614 may, for example and without limitation, reduce the likelihood that saver sub 613 is unintentionally unthreaded from quill 609. In some embodiments, tool joint clamp 614 may include slot 616 into which integrated data recorder 100, 200 may be positioned.

Figure 17:
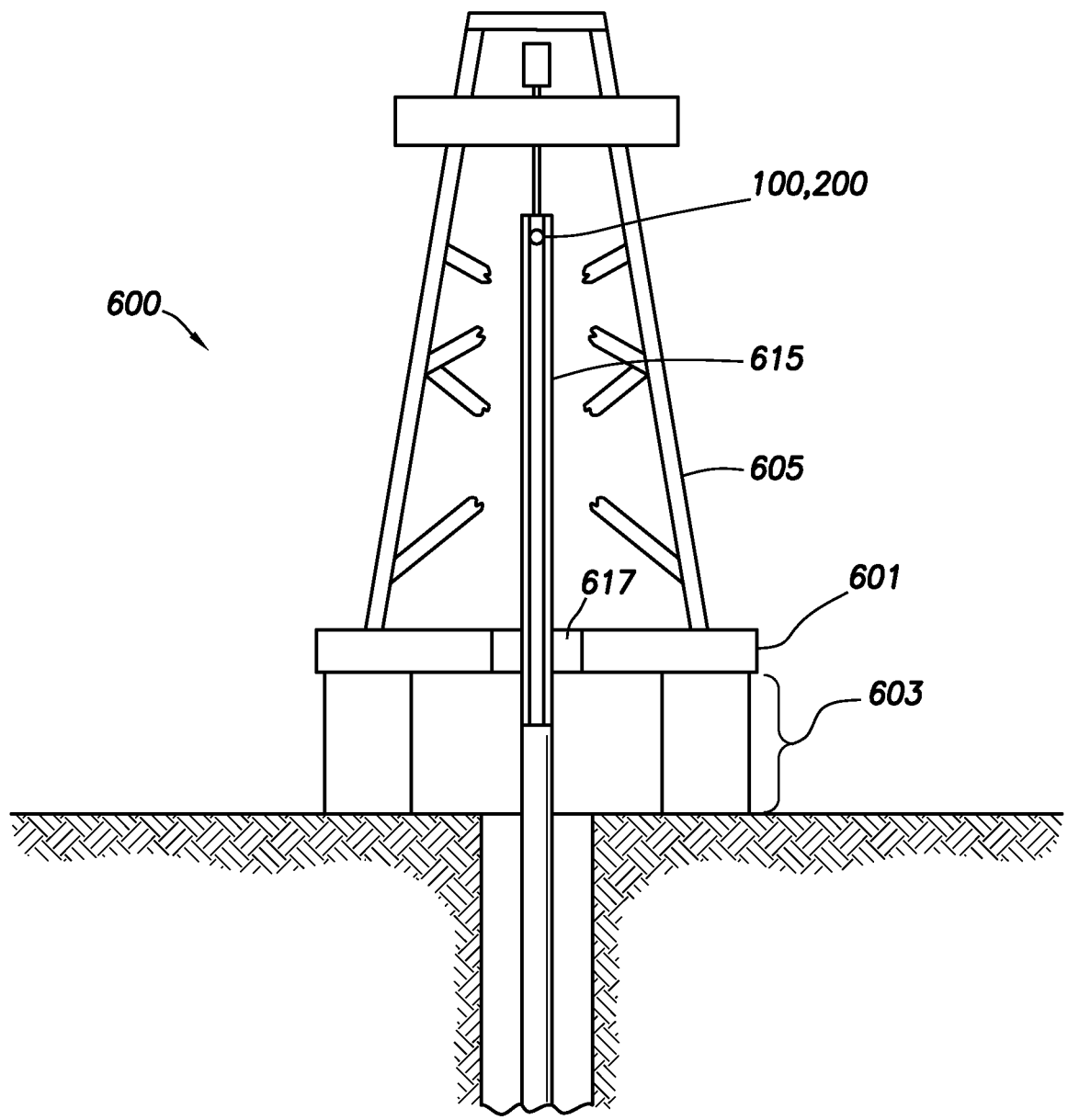
FIG. 17 is a schematic view of a drilling rig including an integrated data recorder consistent with at least one embodiment of the present disclosure positioned in components thereof.

In some embodiments, drilling rig 600 may include kelly 615 as depicted in FIG. 17. Kelly 615 may be coupled to the upper end of drill string 611 and may be used to rotate drill string 611 using rotary table 617. In some embodiments, integrated data recorder 100, 200 may be positioned within kelly 615 or within saver sub 613 positioned between kelly 615 and drill string 611.

Figure 18:
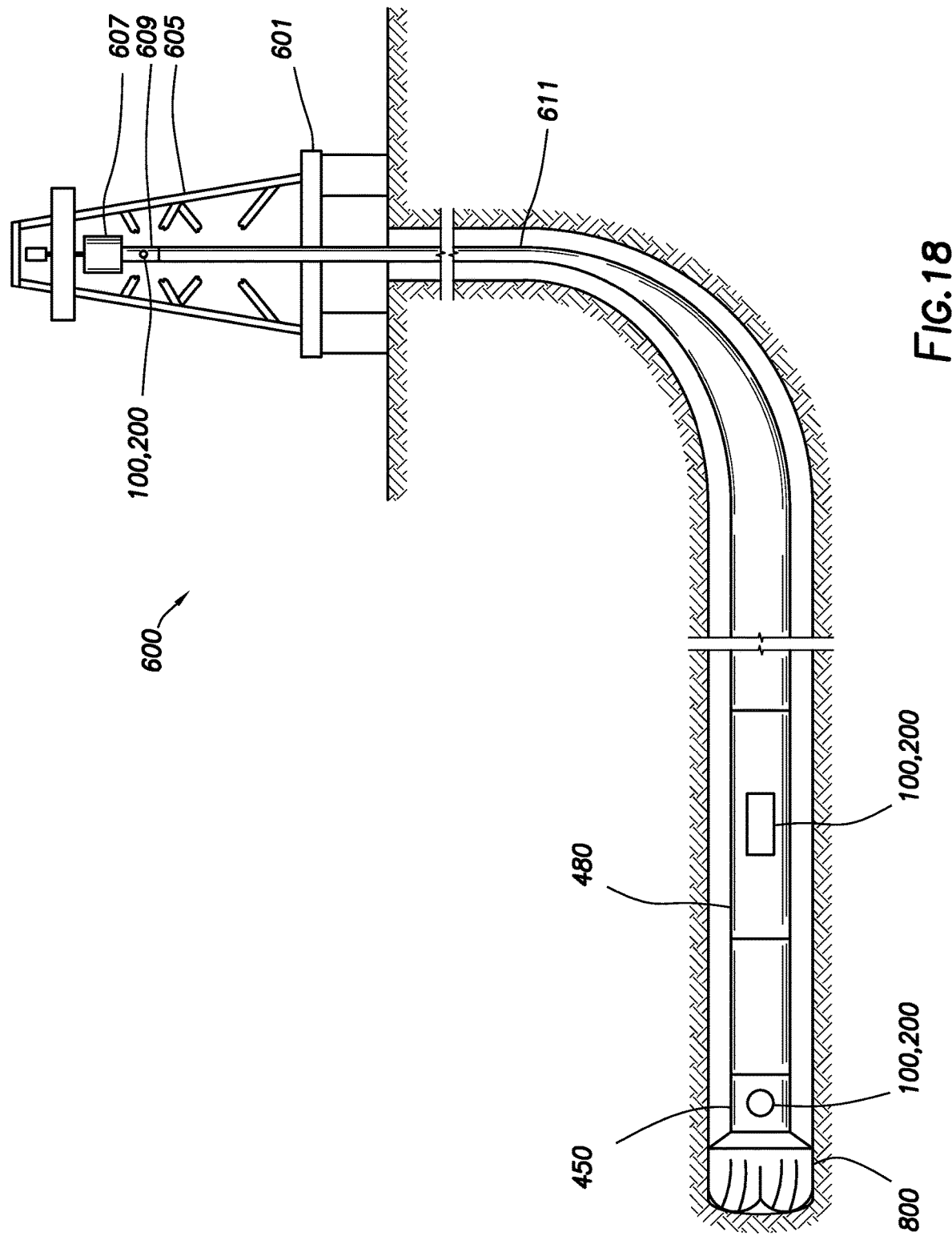
FIG. 18 is a schematic view of a drill string in a wellbore including integrated data recorders consistent with at least one embodiment of the present disclosure.

In some embodiments, multiple integrated data recorders 100, 200 may be included within a single drill string or tool string coupled to various tools 300 at various locations throughout the drill string or tool string. In some such embodiments, as depicted in FIG. 18, integrated data recorders 100, 200 may be located within both downhole and surface tools of the drill string or tool string. For example, integrated data recorders 100, 200 may be positioned in BHA near drill bit 800 or in bit box 450 and positioned spaced apart from drill bit 800 such as at top sub 480. Additionally, one or more integrated data recorders 100, 200 may be positioned at a component of drilling rig 600 such as, for example and without limitation, quill 609 of top drive 607, saver sub 613, or Kelly 615. In some embodiments, measurements may be taken with all integrated data recorders 100, 200 as discussed further below.

In operation, the sensors in sensor package 110 of one or more integrated data recorders 100, 200 located in a downhole tool 300 located within the wellbore may measure drilling dynamics data. The drilling dynamics data may be stored in memory module 115, referred to herein as "memory logging," during the drilling process. When tool 300 is retrieved from the wellbore and positioned at the surface, drilling dynamics data may be retrieved from memory module 115 through wireless communications module 122 without removing integrated data recorders 100, 200 from the downhole tool 300 and may be used by a surface processor such as external device 180. For example, in some embodiments, such as during a drilling, geothermal drilling, or mining operation, tool 300 may be retrieved from the wellbore, drilling dynamics data may be retrieved wirelessly from integrated data recorder 100 or 200, and tool 300 may be redeployed without any disassembly of tool 300 or without physically connecting to integrated data recorder 100 or 200.

In some embodiments, external device 180 at the surface may include a surface processor connected to a cloud data storage and computing server. In some such embodiments, the wirelessly retrieved data may be stored in the cloud data storage and may be processed in the cloud server. For example and without limitation, in some embodiments, a run summary, including rotating hours, flow-on hours, vibration-on hours, shock statistics, stick-slip statistics, or other data gleaned from integrated data recorders 100, 200 may be generated in the cloud server and sent to one or more client devices via the Internet. In some embodiments, both surface recorded drilling dynamics data and downhole recorded drilling dynamics data may be quality-controlled (QC' ed), in the cloud computing system, and combined with data from a surface Electronic Drilling Recorder (EDR). In some embodiments, a drilling dynamics log and accelerometer/gyro spectrograms, such as in JPEG (Joint Photographic Experts Group), PDF (Portable Document Format), may be generated in the cloud computing system. In some embodiments, one or more pattern recognition algorithms (e.g. based on artificial intelligence and machine learning) may be run on the combined data sets to identify, for example and without limitation, operational anomalies and/or data anomalies.

In some embodiments, the sensors in sensor package 110 of one or more integrated data recorders 100, 200 located at the surface may continuously or continually transmit drilling dynamics data recorded from the piece of surface equipment such as top drive 607, quill 609, saver sub 613, or kelly 615 through wireless communications module 122 for use by the surface processor such as external device 180.

In some embodiments, the surface processor may use the drilling dynamics data for post-run and/or continuous (in the case of surface tools including integrated data recorders 100, 200) evaluation of drilling dynamics, frequency spectrum, statistical analysis, and Condition Based Monitoring/Maintenance (CBM). In some embodiments, frequency spectrum analysis may be done, for example, by applying discrete Fourier transform (or fast Fourier transform) to burst data. In some embodiments, statistical analysis may be done, for example, calculating minimum, maximum, median, mean, mode, root-mean-squared values, standard deviation, and variance of burst data. Statistical analysis may include making histograms of, for example, temperature, vibration, shock, inclination, rotation speed, rotation speed standard deviation, and vibration/shock standard deviation. Temperature histograms may include, for example, accumulating the data points in certain temperature bins over multiple deployments (runs) of the sensors and downhole tools.

CBM is maintenance performed when a need for maintenance arises. This maintenance is performed after one or more indicators show that equipment is likely to fail or when equipment performance deteriorates. CBM may apply systems that incorporate active redundancy and fault reporting. CBM may also be applied to systems that lack redundancy and fault reporting.

CBM may be designed to maintain the correct equipment at the right time. CBM may be based on using real-time data, recorded data, or a combination of real-time and recorded data to prioritize and optimize maintenance resources. Observing the state of a system is known as condition monitoring. Such a system will determine the equipment's health, and act when maintenance is necessary. Ideally, CBM will allow the maintenance personnel to do only the right things, minimizing spare parts cost, system downtime and time spent on maintenance.

Drilling dynamics data, such as high-frequency continuously sampled and recorded data, wherein high-frequency data refers to data at 800 Hz-3200 Hz, may be used for rock mechanics analysis. Such rock mechanics analysis include the analysis/identification of fractures, fracture directions, rock confined/unconfined compressive strength, Young's modulus of elasticity, shear modulus, and Poisson's ratio. Such rock mechanics analysis may be accomplished by combining with surface measured parameters, such as WOB (weight on bit), TOB (torque on bit), RPM (revolutions per minute), ROP (rate of penetration), and flow rate. Pseudo formation-evaluation log, such as pseudo-sonic log, pseudo-neutron log, pseudo-porosity log, pseudo-density log, pseudo-Gamma log may be generated with a combination of the analysis of high-frequency continuously sampled and recorded data, along with surface parameters, and other formation-evaluation data, such as natural Gamma log and other logging-while-drilling (LWD) logs. Alternatively, high-frequency continuously-sampled data (e.g. at 800 Hz-3200 Hz) may be used for real-time rock mechanics analysis. Rock mechanical parameters may also be referred to as geomechanical parameters. Alternatively, pseudo-formation evaluation log, such as pseudo-Gamma log may be generated downhole and transmitted to the surface for real-time geo-steering.

In some embodiments, the sensors in sensor package 110 of each of the one or more integrated data recorders 100, 200 located both at the surface and downhole may be identical. In some embodiments, integrated data recorders 100, 200 located both at the surface and downhole may be operated such that all integrated data recorders 100, 200 record the same data at the same or higher resolution. In such an embodiment, the surface processor may receive and analyze drilling dynamics data from both surface and downhole integrated data recorders 100, 200, gathered by identical sensor packages 110 in both the surface and downhole integrated data recorders 100, 200. For example, the surface processor may compare surface drilling dynamics data with downhole drilling dynamics data to identify operational anomalies and earlier detection of downhole dysfunctions. As a non-limiting example, data from downhole sensors connected to a MWD wirelessly or with a physical connection may be transmitted to the surface. However, the transmission speed of the real-time data via, for example, mud pulse telemetry may be very low, such as at 1-2 bits per second. By correlating the downhole and surface drilling dynamics data recorded by integrated data recorders 100, 200, some correlation of, for example, bit drilling dynamics and surface dynamics data, could be identified. Using this correlation to detect early signs of one or more downhole problems, the surface data can be used to monitor downhole problems and operational anomalies. The surface sensor data may be transmitted to the surface computer at the wireless communication speed, such as at 1-10 gigabits per second in real time. The surface data received at the surface computer may be moved to a cloud computing system via the internet for further real-time and/or non-real-time processing. Due to the limitations to transmission of data from downhole to the surface, the use of surface drilling dynamics data (in conjunction with the downhole data correlation) may allow for better and more economical determinations of downhole problems or operational anomalies. In other embodiments, surface and downhole integrated data recorders 100, 200 may be operated in different modes. In some embodiments, when an anomaly is detected from the surface drilling dynamics data, a rig automated control system may adjust surface parameters until a different or smoother signal is received.

Power from electrical energy source 130 may be supplied to the sensors in sensor package 110. In some embodiments, the electrical power from electrical energy source 130 to the sensors in sensor package 110 is always on (powered up) but at different levels. At the lowest power level, which in some embodiments may be used while integrated data recorder 100, 200 are being transported, integrated data recorder 100, 200 may be in "deep-sleep mode." In deep sleep mode, the real-time clock, sensors, for example, sensors 111, 112, 113, 114, 116, 117 and 119, memory module 115, and voltage regulator are powered off and processor 105 is placed in sleep mode. In certain embodiments, current consumption of this deep-sleep mode may be between 1 uA and 200 uA. In sleep mode, processor 105 does not function, except to receive a "wake-up" signal. The wake-up signal may, in some embodiments, be received through wireless communications module 122. In some embodiments, integrated data recorder 100, 200 may be placed in deep sleep mode by a software command to processor 105 received through wireless communications module 122. Integrated data recorder 100, 200 may be transitioned from deep-sleep mode to standby mode by communicating the wake-up signal to processor 105 through wireless communications module 122 while processor 105 is in passive mode. In some embodiments, processor 105 may be woken up by one or more active mode predetermined event criteria including, for example and without limitation, an inclination trigger, RPM trigger, temperature trigger, vibration trigger, or pressure trigger, in which a certain inclination of tool 300, rotation rate of tool 300, temperature measurement, vibration of tool 300, or pressure measurement, respectively, measured by one or more corresponding sensors of sensor package 110 of integrated data recorder 100, 200 causes processor 105 to enter the standby or operational state.

Deep-sleep mode may, for example and without limitation, extension of battery life during transportation and/or storage without requiring physical disassembly of integrated data recorder 100, 200. Physical disassembly of integrated data recorder 100, 200 may damage seals, threads, wires, and other elements if done by an unfamiliar technician in a remote location. The recorder may be in "deep-sleep mode" for as much as between 1 month and 1 year before it is sent downhole for dynamics data logging.

In standby mode, processor 105 and at least one sensor (active sensor) of sensor package 110 are active. Digital solid-state sensors may be put into standby mode using a digital command. Standby current to remaining sensors of sensor package 110 may be around 1 µA to 200 uA. Once an active mode predetermined event criterion is met, as determined, for example, by the active sensor, processor 105 sends a command to the remaining sensors of sensor package 110 to begin measurement of data and to memory module 115 to begin logging data ("active mode").

FIG. 14 is a block diagram of an embodiment of integrated data recorder 100, 200. Integrated data recorder 100, 200 may include sensor package 110 having a plurality of sensors.

The active mode predetermined event criterion may be, for example, a temperature, acceleration, acceleration standard deviation, rotation speed standard deviation, or inclination threshold as determined by the active sensor. The active mode predetermined event may also be a drill string or bit rotation rate threshold. In some embodiments, the active mode predetermined event criterion may be a combination of one or more of a temperature threshold, acceleration threshold, acceleration standard deviation threshold, rotation speed standard deviation threshold, inclination threshold, drill string rotation rate threshold, or bit rotation rate threshold. In some embodiments, the active mode threshold that predetermines event criterion may be stored in digital, solid-state sensors, which may generate interrupt events to processor 105. For example, one non-limiting example of a digital, solid-state sensor with such feature is an $I^2C$ digital temperature sensor, Model MCP9800 from Microchip (Chandler, Ariz., USA). Temperature thresholds with hysteresis (e.g. upper threshold and lower threshold) may be stored in MCP9800. In certain embodiments, all sensors are non-active during standby mode and the drill string or bit rotation (using accelerometers, gyros, magnetometers or a combination thereof) may be communicated to and received by integrated data recorder 100, 200 via downlink communication from the surface. In certain embodiments, downlink communication may be accomplished by mud-pulse telemetry, electro-magnetic (EM) telemetry, wired-drill-pipe telemetry or a combination thereof. In other embodiments, downlink communication may be accomplished by varying the drill string rotation rate, for example and not limited to the method described in US Patent Publication No. 2017/0254190, entitled System and Method for Downlink Communication, published Sep. 7, 2017.

In certain embodiments, during active mode, once a predetermined passive mode criterion has been met, processor 105 may send a command to the sensors of sensor package 110 and memory module 115 to return to standby mode, thereby discontinuing measurement of data by the sensors and logging of data by memory module 115. The passive mode predetermined event criterion may be, for example, a temperature threshold, acceleration threshold, acceleration standard deviation threshold, RPM threshold, or inclination threshold as determined by one or more sensors of sensor package 110. In some embodiments, the passive mode thresholds that predetermine event criterion may be stored in digital, solid-state sensors, which may generate interrupt events to processor 105. One non-limiting example of digital, solid-state sensor with such feature is an $I^2C$ digital temperature sensor, Model MCP9800 from Microchip (Chandler, Ariz., USA). Temperature thresholds with hysteresis (e.g. upper threshold and lower threshold) may be stored in MCP9800. In one non-limiting example, the digital, solid state sensor made may change from the passive mode (no logging) to the active mode (logging) and from the active mode (logging) to the passive mode (no logging) multiple times, based on one or more, or a combination of event thresholds.

In active mode, sensors in sensor package 110 are turned on for a predetermined duration at a predetermined log interval for measurement of drilling dynamics data. Examples of predetermined duration include 1-10 seconds. Examples of predetermined log intervals are every 1, 2, 5, 10, 20, 30, or 60 seconds and durations between those values. Predetermined log intervals for each of the sensors in sensor package 110 may be the same or different. Predetermined durations for each of the sensors in sensor package 110 may be the same or different.

In certain embodiments, the sensors of sensor package 110 record burst data to memory module 115 at a burst data frequency. In some embodiments, the burst data frequency may, for example and without limitation, be 20 Hz or more, 50 Hz or more, 100 Hz or more, 200 Hz or more, 400 Hz or more, 800 Hz or more, 1600 Hz or more, or 3200 Hz or more. Examples of burst data log interval include every 1, 2, 5, 10, 20, 30, or 60 seconds. The sensor burst data may be buffered in digital sensors in the built-in sensor memory, which may be configured as FIFO (first-in first-out) memory. In certain embodiments, processor 105 does not store sensor burst data in processor's RAM (random access memory), i.e., sensor data is sent directly from the sensors in sensor package 110 to memory module 115. In certain embodiments, processor 105 may store a predetermined number of samples of sensor burst data (for example, just one sample of sensor burst data) in the RAM of processor 105 prior to sending the sensor burst data to memory module 115. In other embodiments, high-frequency sampling data, for example, at 3200 Hz, is continuously stored to memory module 115, such as continuously bursting and recording.

The use of the FIFO memory of a sensor may reduce processor 105 processing capability requirements and processor 105 power consumption. In certain embodiments, the number of the FIFO memories of a sensor may be between 32 and 1025 data points, or between 32 and 512 data points per sensor axis. One FIFO memory may hold, for example, 16 bits or 32 bits, depending on the sensor output resolution. For example, a 3-axis sensor may contain up to 16-bit×100-points×3-axis=48000 bits of FIFO memory. In some embodiments, the sensors of sensor package 110 may record statistics of some or each of the sensors. For example, the statistics of the high-g 3-axis accelerometer data, such as minimum, maximum, mean, median, root-mean-squared, standard deviation, and variance values may be recorded by the sensor package and, in certain embodiments, transmitted to memory module 115. In some embodiments, sensor package 110 may record burst data of the low-g 3-axis digital accelerometer data and 3-axis digital gyroscope. In other embodiments, sensor package 110 may record continuously sampled data, for example, at 1600 Hz, of the 3-axis digital accelerometer data and 3-axis digital gyroscope. Raw analog-to-digital counts for accelerometers and gyroscopes, i.e., a number representing voltage, may be recorded in memory module 115 without temperature calibration or conversion to final units. In certain embodiments, temperature calibration may be performed by processor 105 for drilling dynamics data measured by the sensors of sensor package 110. Temperature calibration may correct for the scale drift factor and offset drift over temperature. In certain embodiments, temperature calibration may be accomplished, for example, by look-up tables.

In some embodiments, ranges of some or all of the sensors in sensor package 110 may be changed while integrated data recorder 100, 200 is within the wellbore. For example, the low-G accelerometer sensing range is programmable and changeable downhole from +/−4G to +/−16G and all ranges therebetween. Ranges may be changed based on attainment of a predetermined range threshold value or by communication by downlink from the surface. Examples of predetermined range thresholds include, but are not limited to values of rotation speed standard deviation, acceleration standard deviation, or combinations thereof.

In certain embodiments, sampling frequency of some or all of the sensors in sensor package 110 may be changed while integrated data recorder 100, 200 is within the wellbore. Sample frequency may be changed based on attainment of a predetermined sampling threshold value or by communication by downlink from the surface. Examples of predetermined sampling thresholds include, but are not limited to, values of rotation speed standard deviation, acceleration standard deviation, or combinations thereof.

In some embodiments, some or all of the sensors in sensor package 110 may include an anti-aliasing filter on one or all of the axes of the sensor. The frequency of the anti-aliasing filter may be changed while integrated data recorder 100, 200 is within the wellbore. For example, the anti-aliasing filter may be changed to between 25 Hz and 3200 Hz for accelerometers. In some embodiments, the anti-aliasing filter frequency may be changed when sampling frequency is changed to avoid aliasing.

In some embodiments, integrated data recorder 100, 200 may with an MWD tool through communications port 120 or through wireless communications module 122. In one non-limiting example, statistics of downhole dynamics data (for example, maximum shock, RPM standard deviation, root-mean-squared shock, mean vibration, median inclination, etc.) may be transmitted to surface via an MWD mud-pulse telemetry, electro-magnetic (EM) telemetry, EM short-hop telemetry, wired-drill-pipe telemetry or a combination thereof. In some embodiments, the sensor data may be transmitted to the MWD tool wirelessly. For example, an at-bit integrated data recorder 100, 200 may transfer the sensor data from the bit to an MWD tool with a wireless module, via integrated data recorders 100, 200 placed at multiple locations in a bottom-hole assembly (BHA). A wireless network, such as, for example and without limitation, Z-wave, may allow the data transferred from one device to another via other wireless modules using Z-wave's source-routed mesh network architecture. In some embodiments, the MWD tool may relay the drilling dynamics data to surface via a communications channel including, for example and without limitation, mud-pulse telemetry, electro-magnetic (EM) telemetry, EM short-hop telemetry, wired-drill-pipe telemetry or a combination thereof. In some embodiments, wireless integrated data recorders placed at many different positions in a drill string may relay at-bit sensor information from a bit to surface, such as, for example, for real-time geo-steering applications.

In some embodiments, integrated data recorder 100, 200 may be positioned in an existing tool. In some embodiments, integrated data recorder 100, 200 may be added to the downhole tool without altering the tool length or mechanical integrity of the tool. In some such embodiments, a slot as described herein above may be formed in one or more components of the existing tool, and one or more integrated data recorders 100, 200 may be placed therein.

In some embodiments, integrated data recorder 100, 200 may be utilized during transportation of tool 300. In such an embodiment, integrated data recorder 100, 200 may measure one or more aspects of the movement of tool 300 including, for example and without limitation, the location of tool 300 and one or more parameters relating to the handling of tool 300 including detection of drops, shock loads, or other mishandling of tool 300.

In some embodiments, information about the operation of bottom-hole assembly (BHA) may be transmitted to the surface via mud pulse telemetry. In some embodiments, temperature difference, temperature gradient, and other drilling dynamics information may be classified into different severity levels, for example, 4 to 8 severity levels indicative of a measured condition. As a non-limiting example, in embodiments in which 2-bit severity levels (4 levels) are used, a temperature difference may be coded as Level 1 which may be between 0 and 2 degrees centigrade, Level 2 between 2 and 4 degrees centigrade, Level 3 between 4 and 6 degrees centigrade, and Level 4 above 6 degrees centigrade. Similarly, downhole acceleration events or shocks may be coded as Level 1 (no shock) between 0 and 10 g, Level 2 (low) between 10 and 40 g, Level 3 (medium) between 40 and 100 g, and Level 4 (high) above 100 g. As another example, high-frequency torsional oscillation (HFTO) may be detected with tangential acceleration measurement or angular gyro measurement with an expected frequency range, for example, between 100 and 1600 Hz. Angular acceleration can be calculated by time-differentiating the angular gyro velocity. By applying a digital band-pass, digital band-reject, analog band-pass, analog band-reject, high-pass filter, digital high-pass filter, analog high-pass filter, or a combination thereof on a tangential accelerometer or gyro, downhole HFTO events may be coded as Level 1 (no HFTO) between 0 and 10 g, Level 2 (low HFTO) between 10 and 40 g, Level 3 (medium HFTO) between 40 and 100 g, and Level 4 (high HFTO) above 100 g. Alternatively, at integrated data recorder, filtered accelerations (for example, tangential accelerations, lateral accelerations, radial accelerations, angular accelerations, axial accelerations, etc.) may be used to estimate pseudo-formation-evaluation parameters, such as pseudo-sonic log, pseudo-neutron log, pseudo-porosity log, pseudo-density log, and pseudo-Gamma log. Pseudo formation-evaluation parameters and/or their severity levels may be transmitted to surface for geo-steering.

Rock mechanics parameters (e.g. Young's modulus, Poisson's ratio, compressive strength, and Fractures) may be detected with tri-axial high-frequency acceleration measurement with an expected frequency range, for example, between 100 and 1000 Hz, as described, for example in SPWLA 2017—"A Novel Technique for Measuring (Not Calculating) Young's Modulus, Poisson's Ratio and Fractures Downhole: A Bakken Case Study". By applying a digital band-pass, digital band-reject, analog band-pass, analog band-reject, digital high-pass filters, analog high-pass filters, or a combination thereof on the at least one accelerometer or gyro, downhole fractures may be coded as Level 1 (no fractures) between 0 and 10, Level 2 (low) between 10 and 40, Level 3 (medium) between 40 and 100, and Level 4 (high) above 100 (the numbers are without units, but correlated to the number of fractures). Rock mechanics parameters and/or their severity levels may be transmitted to surface for geo-steering.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising: providing a first integrated data recorder, the first integrated data recorder positioned within a tool, the tool being a steering tool of a bottomhole assembly, the first integrated data recorder including: a sensor package, the sensor package comprising one or more drilling dynamics sensors; a memory module, the memory module in data communication with the sensor package; a wireless communications module, the wireless communications module in data communication with the processor; a processor, the processor in data communication with the one or more drilling dynamics sensors; and an electrical energy source, the electrical energy source in electrical communication with the memory module, the sensor package, and the processor; taking measurements using the drilling dynamics sensors, the measurements comprising pseudo formation-evaluation parameters; transmitting the measurements from the drilling dynamics sensors to an external device using the wireless communications module; and geo-steering the bottomhole assembly based on the pseudo formation-evaluation parameters.

2. The method of claim 1, further comprising memory logging the measurements from the drilling dynamics sensors in the memory module:
 removing the tool from the wellbore; and
 retrieving the drilling dynamics data with a surface processor.

3. The method of claim 2, further comprising using the drilling dynamics data for post run analysis, real-time analysis, or a combination thereof of rock mechanics.

4. The method of claim 2, further comprising using the drilling dynamics data for post run evaluation of drilling dynamics, frequency spectrum, statistical analysis, condition-based monitoring/maintenance (CBM), or a combination thereof.

5. The method of claim 4, further comprising prior to positioning the tool within the wellbore, operating the first integrated data recorder in deep-sleep mode.

6. The method of claim 5, further comprising: sending a wake-up signal to the first integrated data recorder; and operating the first integrated data recorder in standby mode.

7. The method of claim 6, further comprising: receiving a downlink communication, the downlink communication including one or more of drill string or bit rotation; operating the first integrated data recorder in active mode when the processor receives the downlink communication.

8. The method of claim 7, wherein the taking measurements using the drilling dynamics sensors step is performed for a predetermined duration at a predetermined log interval.

9. The method of claim 8, wherein the predetermined duration is between 1 and 10 seconds.

10. The method of claim 8, wherein the predetermined log interval is between 1 and 60 seconds.

11. The method of claim 8, wherein continuously sampled data is recorded in memory.

12. The method of claim 6, wherein the plurality of drilling dynamics sensors includes an active sensor and one or more remaining sensors, the method further comprising: setting an active mode predetermined event criterion; measuring drilling dynamics data using the active sensor; and operating the first integrated data recorder in active mode when the active sensor in combination with the processor determines that the active mode predetermined event criterion has occurred.

13. The method of claim 12, wherein the active mode predetermined event criterion comprises a temperature threshold, acceleration threshold, acceleration standard deviation threshold, rotation speed standard deviation threshold, inclination threshold, drill string rotation rate threshold, bit rotation rate threshold, or a combination thereof.

14. The method of claim 13, wherein the temperature threshold, acceleration threshold, acceleration standard deviation threshold, rotation speed standard deviation threshold, inclination threshold, drill string rotation rate threshold, or bit rotation rate threshold is stored in the active sensor, the active sensor configured to generate an interrupt event to the processor when the active mode predetermined event criterion has occurred.

15. The method of claim 1, wherein the drilling dynamics sensors burst data to the memory module at a burst data frequency.

16. The method of claim 15, wherein the burst data is logged at a log interval, wherein the log interval is between 1 and 60 seconds.

17. The method of claim 16, wherein the sensors include memory and wherein the burst data is stored in the sensor's memory.

18. The method of claim 16, wherein the sensors include sensor memory, and wherein continuously sampled data is stored in sensory memory.

19. The method of claim 1, wherein the drilling dynamics data is calibrated for temperature.

20. The method of claim 1, wherein the drilling dynamics sensors have ranges and wherein the ranges are changed while the tool is within the wellbore.

21. The method of claim 1, wherein the drilling dynamics sensors have a sampling frequency and wherein the sample frequency is changed while the tool is within the wellbore.

22. The method of claim 1, wherein the drilling dynamics sensors include an anti-aliasing filter and the anti-aliasing filter is changed while the tool is within the wellbore.

23. The method of claim 1, further comprising communicating with a measurement-while drilling (MWD) through a communications port in data communication with the memory module.

24. The method of claim 1, further comprising communicating with a measurement-while drilling (MWD) wirelessly through the wireless communications module in data communication with the memory module.

25. The method of claim 1, further comprising memory logging the measurements from the one or more drilling dynamics sensors in the memory module to form drilling dynamics data.

26. The method of claim 1, wherein the measurements from the drilling dynamics sensors are transmitted continuously.

27. The method of claim 1, further comprising processing the measurements to form downhole-processed pseudo-formation-evaluation data; and transmitting the downhole-processed pseudo-formation-evaluation data continuously.

28. The method of claim 1, further comprising:
positioning the tool within a wellbore, wherein the measurements are taken using the drilling dynamics sensors while the tool is within the wellbore;
memory logging the measurements from the one or more drilling dynamics sensors in the memory module to form drilling dynamics data; and
retrieving the tool from the wellbore to the surface, wherein transmitting the measurements comprises transmitting the memory logged measurements from the memory module.

29. The method of claim 1, wherein the measurements further comprise geomechanics parameters, and wherein the method further comprises geo-steering the bottomhole assembly based on the geomechanics parameters.

30. The method of claim 1, wherein the pseudo-formation evaluation parameters comprise one or more of pseudo-sonic log, pseudo-neutron log, pseudo-porosity log, pseudo-density log, and pseudo-Gamma log.

31. The method of claim 1, further comprising transmitting the measurements from the drilling dynamics sensors to the cloud with the external device.

32. The method of claim 1, further comprising: providing a second integrated data recorder; and transmitting the measurements from the drilling dynamics sensors from the second integrated data recorder to the first integrated data recorder.

33. The method of claim 32, wherein one of the first or second integrated data recorders is positioned in a wellbore, and the other of the first or second integrated data recorders is positioned at the surface.

34. The method of claim 33, wherein the surface integrated data recorder is positioned in a kelly, a saver sub, a quill, or a tool joint clamp of a top drive located at the surface.

35. A method comprising: providing a first integrated data recorder, the first integrated data recorder positioned within a tool, the first integrated data recorder including: a sensor package, the sensor package comprising one or more drilling dynamics sensors; a memory module, the memory module in data communication with the sensor package; a wireless communications module, the wireless communications module in data communication with the processor; a processor, the processor in data communication with the one or more drilling dynamics sensors; and an electrical energy source, the electrical energy source in electrical communication with the memory module, the sensor package, and the processor; taking measurements using the drilling dynamics sensors; transmitting the measurements from the drilling dynamics sensors to an external device using the wireless communications module; providing a second integrated data recorder; operating the first and second integrated data recorders to record the same data at the same or higher resolution; and transmitting the measurements from the drilling dynamics sensors from the second integrated data recorder to the first integrated data recorder.

36. The method of claim 35, comprising comparing downhole drilling dynamics data recorded by the first integrated data recorder and surface drilling dynamics data from the second integrated data recorder by a surface processor of the external device.

37. The method of claim 36, further comprising identifying one or more operational anomalies from the compared downhole and surface drilling dynamics data.

38. The method of claim 36, further identifying detecting downhole disfunctions from the compared downhole and surface drilling dynamics data.

39. The method of claim 36, further comprising correlating the downhole and surface drilling dynamics data to identify a correlation between bit and/or drillstring drilling dynamics data and surface dynamics data.

40. The method of claim 39, further comprising identifying one or more downhole problems or operational anomalies using surface drilling dynamics data.

41. The method of claim 40, wherein surface drilling dynamics data are transmitted wirelessly to the surface processor in real-time.

42. The method of claim 36, wherein the first integrated data recorder and the second integrated data recorder are identical.

43. A method comprising: providing a first integrated data recorder, the first integrated data recorder positioned within a tool, the first integrated data recorder including: a sensor package, the sensor package comprising one or more drilling dynamics sensors; a memory module, the memory module in data communication with the sensor package; a wireless communications module, the wireless communications module in data communication with the processor; a processor, the processor in data communication with the one or more drilling dynamics sensors; and an electrical energy source, the electrical energy source in electrical communication with the memory module, the sensor package, and the processor; taking measurements using the drilling dynamics sensors; transmitting the measurements from the drilling dynamics sensors to an external device using the wireless communications module; providing a second integrated data recorder; transmitting the measurements from the drilling dynamics sensors from the second integrated data recorder to the first integrated data recorder; and running one or more pattern recognition algorithms on the measurements from the first and second integrated data recorders to identify operational or data anomalies.

44. The method of claim 43, wherein the pattern recognition algorithm comprises artificial intelligence or machine learning.

45. The method of claim 43, further comprising identifying an anomaly, and adjusting one or more surface parameters until a different or smoother signal is received.

* * * * *